(12) United States Patent
Muramoto et al.

(10) Patent No.: US 7,950,053 B2
(45) Date of Patent: May 24, 2011

(54) FIREWALL SYSTEM AND FIREWALL CONTROL METHOD

(75) Inventors: Eiichi Muramoto, Kanagawa (JP); Takahiro Yoneda, Tokyo (JP)

(73) Assignee: Panasonic Corporation, Osaka (JP)

( * ) Notice: Subject to any disclaimer, the term of this patent is extended or adjusted under 35 U.S.C. 154(b) by 691 days.

(21) Appl. No.: 11/575,310

(22) PCT Filed: Oct. 12, 2005

(86) PCT No.: PCT/JP2005/018774
§ 371 (c)(1),
(2), (4) Date: Mar. 15, 2007

(87) PCT Pub. No.: WO2006/041080
PCT Pub. Date: Apr. 20, 2006

(65) Prior Publication Data
US 2007/0214501 A1 Sep. 13, 2007

(30) Foreign Application Priority Data
Oct. 12, 2004 (JP) ................................. 2004-297872

(51) Int. Cl.
*H04L 9/00* (2006.01)
(52) U.S. Cl. ............... 726/13; 726/11; 726/26; 370/328
(58) Field of Classification Search ........................ None
See application file for complete search history.

(56) References Cited

U.S. PATENT DOCUMENTS

| | | | | |
|---|---|---|---|---|
| 6,523,696 B1 * | 2/2003 | Saito et al. | ................... | 709/223 |
| 6,684,329 B1 * | 1/2004 | Epstein et al. | ................. | 713/150 |
| 7,554,949 B2 * | 6/2009 | Chen | .............................. | 370/331 |
| 2005/0091532 A1 * | 4/2005 | Moghe | ......................... | 713/201 |
| 2005/0165917 A1 * | 7/2005 | Le et al. | ........................ | 709/220 |
| 2010/0061309 A1 * | 3/2010 | Buddhikot et al. | ........... | 370/328 |

FOREIGN PATENT DOCUMENTS

| | | |
|---|---|---|
| JP | 10-70576 | 3/1998 |
| JP | 2000-151677 | 5/2000 |
| JP | 2001-313640 | 11/2001 |
| JP | 2003-229893 | 8/2003 |
| JP | 2003-229915 | 8/2003 |
| JP | 2004-38557 | 2/2004 |
| JP | 2004-180155 | 6/2004 |

* cited by examiner

*Primary Examiner* — Vivek Srivastava
*Assistant Examiner* — Michael Anderson
(74) *Attorney, Agent, or Firm* — Pearne & Gordon LLP

(57) ABSTRACT

It is made possible to appropriately execute packet filtering and unauthorized access detection in a situation in which mobile network communications are operated.

A home agent 404A acquires IP address, port number, and media type obtained by call control of a call control proxy server 403A and sends them to a firewall 700. A packet filtering unit 400 of the firewall 700 performs packet filtering so as to allow the IP packet determined according to the IP address and port number pair to pass through. An unauthorized access monitor 701 takes out information of the corresponding media type out of the normal access determination condition previously defined for each media type, monitors a packet based on the normal access determination condition, and detects that access deviating from normal access is unauthorized access.

5 Claims, 23 Drawing Sheets

FIG. 14

| MEDIA TYPE | POINTER TO SIGN INSPECTION FUNCTION |
|---|---|
| m=audio 0 RTP/AVP 0, a=rtpmap:0 PCMU/8000 | POINTER TO INCREASE INSPECTION FUNCTION OF RTP HEADER SEQUENTIAL NUMBER, ARGUMENT LIST 1 AND POINTER TO INCREASE INSPECTION FUNCTION OF RTP HEADER TIME STAMP, ARGUMENT LIST 2 AND POINTER TO PAYLOAD FUNCTION INSPECTION FUNCTION, ARGUMENT LIST 3 |
| M=video 0 RTP/AVP 32 | POINTER TO INCREASE INSPECTION FUNCTION OF RTP HEADER SEQUENTIAL NUMBER, ARGUMENT LIST 4 AND POINTER TO INCREASE INSPECTION FUNCTION OF RTP HEADER TIME STAMP, ARGUMENT LIST 5 AND POINTER TO PAYLOAD FUNCTION INSPECTION FUNCTION, ARGUMENT LIST 6 |

705a  705b

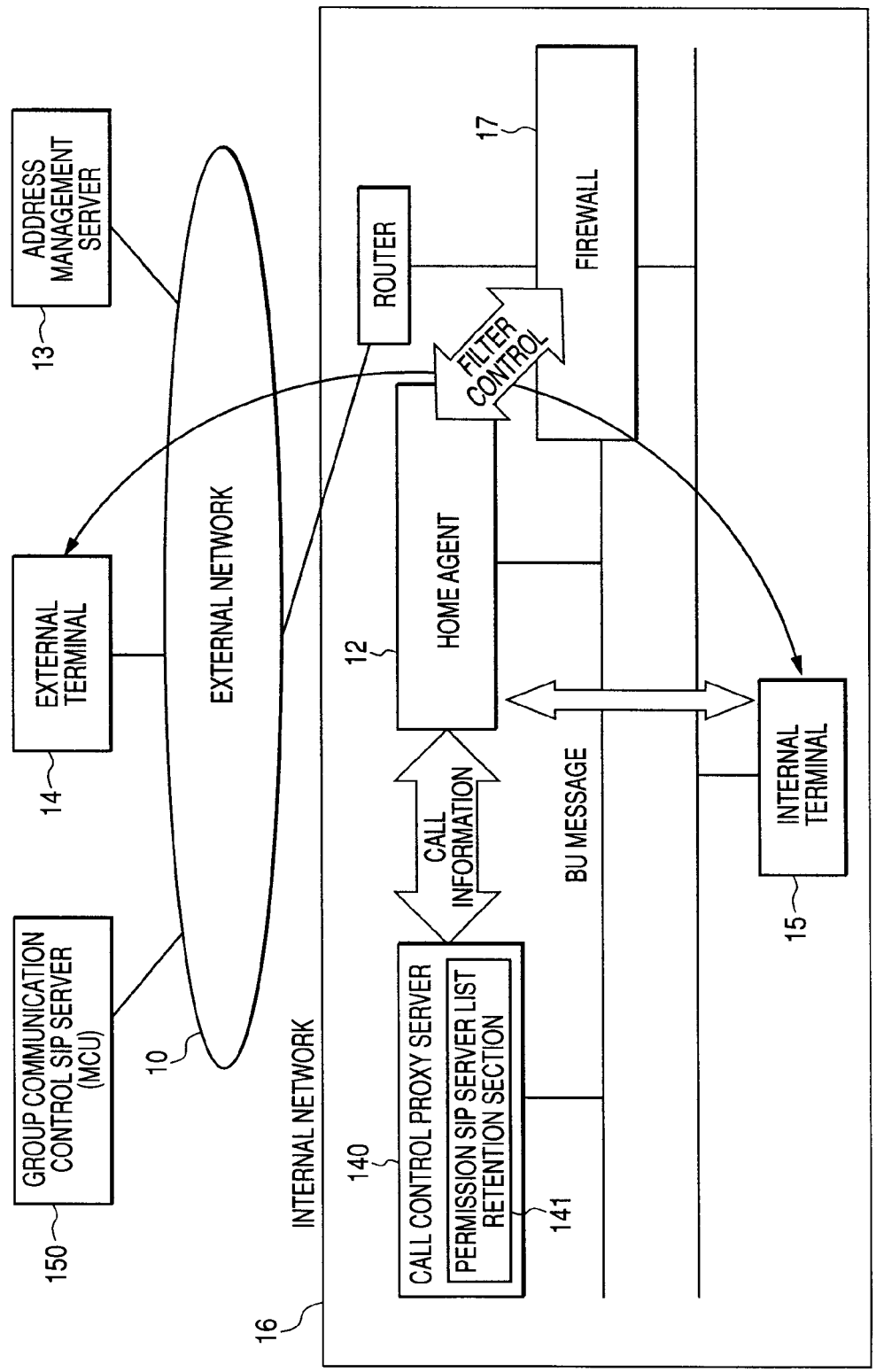

FIREWALL SYSTEM AND FIREWALL CONTROL METHOD

TECHNICAL FIELD

This invention relates to a firewall system and a firewall control method for dynamically controlling a firewall in a network where communications using a mobile network of mobile IP, etc., are operated.

BACKGROUND ART

To connect to a network that can be accessed from an indefinite number of terminals, such as the Internet in an enterprise, a university, a home, etc., it is necessary to protect the internal network against attack from the external network. Thus, hitherto a firewall has been installed between the internal network and the external network.

The firewall generally is made up of an unauthorized access detection unit and a packet filtering unit. If an attack is made from the external network or a sign of unauthorized access is observed between the internal network and the external network, the unauthorized access detection unit notifies the network manager, etc., of the fact.

The packet filtering unit is a unit for allowing only packets used in necessary communications conducted between the internal network and the external network to pass through and blocking other packets.

(Technique of Unauthorized Access Detection Unit)

The unauthorized access detection unit detects an attack made by an attacker or unauthorized access by monitoring a flow sequence of a packet. The attack or unauthorized access detection techniques are roughly classified into the following two:

(1) Detecting the monitored packet sequence showing a sign of unauthorized access.

(2) Detecting the monitored packet sequence deviating from normal access.

The latter is a technique expected to make it possible to raise accuracy of detection of unauthorized access because it can detect operation other than normal access. However, it is difficult to stipulate normal access and provide a database in an environment in which various communications are conducted.

Thus, often the former method is operated with the targets limited. For example, a method of detecting port scan of sending a packet to a plurality of ports of a specific internal terminal, thereby examining whether or not service is activated on the port from an external network as a sign of unauthorized access has been operated. However, this method requires that information of a sign of unauthorized access be registered in an unauthorized access detection system for each technique of unauthorized access, and therefore the method has a weak point that it is hard to detect a new attack method.

The following arts are proposed as those belonging to the latter:

(2A) An unauthorized access shutoff system including a communication relay control section for receiving communication data from an external network and transferring the communication data to a server only if the communication data is normal; a normal access information storage section for storing one or more types of conditions of communication data contributing to providing service intended by the server as feature information of normal communication data; and an normal access determination section for reading the feature information from the normal access information storage section, comparing the feature information with the communication data received by the communication relay control section, and determining that only the communication data satisfying all of the feature information is normal (refer to patent document 1).

(2B) A method of determining the access type in a communication network, including the steps of defining protocol specifications and/or access policy for accepting external access made through a communication network as normal access for each target communication system or communication system group, capturing transmission information addressed to the communication system or the communication system group from among pieces of transmission information distributed through the communication network, and determining that transmission information not meeting the protocol specifications or the access policy from among the captured pieces of transmission information is transmission information having a probability of unauthorized access (refer to patent document 2).

(System of Packet Filtering Unit)

The packet filtering unit allows a packet communicated between an internal network and an external network to pass through if the packet conforms to predetermined rules; does not allow the packet to pass through if the packet does not conform to the predetermined rules. The rules are rules representing the descriptions of "permitting access from a specific host," "permitting http (HyperText Transfer Protocol) access from internal network to external network," "permitting ftp (File Transfer Protocol) access to a specific port from external network to internal network if ftp is started from internal network to external network," etc. The packet filtering unit allows only packets conforming to the rules to pass through and blocks other packets, thereby defending the system against attack and unauthorized access from the external network to the internal network.

IP address units and pair units of IP addresses and port numbers are mainly used as the packet passage control units of the packet filtering unit.

Control in the IP address units can be realized as a rule of allowing all packets transferred between a specific terminal on the external network and a specific terminal on the internal network to pass through. Specifically, letting the IP address of a personal computer connected to the external network using dialup or hot spot be 202.123.12.1 and the IP address of an electronic mail server on the internal network be 202.32.21.1, the rule of permitting a packet communicated from the personal computer to the electronic mail server can be described as "Allow 202.123.12.1 202.32.21.1." In the rule, Allow represents permitting packet passage, 202.123.12.1 represents the source IP address, and 202.32.21.1 represents the destination IP address. The packet filtering unit allows all packets conforming to the rule to pass through. Such control of allowing or not allowing the packet specified by the pair of the source IP address and the destination IP address is called control in IP address units.

Control in pair units of IP addresses and port numbers can be realized as a rule of allowing data transmitted from a specific port of a specific terminal on the external network to pass through to a specific port where an application of a specific terminal stands by on the internal network. For example, let the IP address of an IP telephone terminal on the external network be 202.123.12.2, the port number of the port where an audio data transmission application is started in the terminal be 12345, the IP address of an IP telephone terminal on the internal network be 202.32.21.2, and the port number of the port where an audio data reception application is started in the terminal be 23456. In this case, the rule of permitting the audio data to pass through can be described as "Allow 202.123.12.2 12345 202.32.21.2 23456." In the rule, Allow represents permitting packet passage and 202.123.12.2, 12345, 202.32.21.2, and 23456 represent the source IP address, the source port number, the destination IP address, and the destination port number respectively. The packet filtering unit allows all packets conforming to the rule to pass through. Such control of allowing or not allowing the packet specified by the pair of the source IP address and the source port number and the pair of the destination IP address and the destination port number is called control in pair units of IP addresses and port numbers.

To make an attack from an external network to an internal network, a technique of capturing a specific terminal and attacking a terminal on the internal network from the specific terminal is often used. In this case, if the packet filtering unit performs control in IP address units, it is made possible to access all services (applications) in the terminal on the internal network from the captured specific terminal; this is undesirable. That is, if control in pair units of IP addresses and port numbers is performed, the attack range can be narrowed; this is more desirable.

However, the pair of the source IP address and the source port number and the pair of the destination IP address and the destination port number are information not made clear between the terminals until communications are established. Thus, a unit positioned midway in the network like the packet filtering unit cannot easily acquire the IP address and port number pair information.

To solve such a problem, a method of using a server for relaying call control to establish communications and acquiring the information is known (for example, refer to patent documents 3 and 4). The call control proxy server will be discussed below:

(Call Control Proxy Server)

Communication control based on SIP (Session Initiation Control) is available as call control for establishing communications between specific terminals. The SIP defines the format and the sequence of control messages for adjusting the IP address, the port number, the codec type, the band, etc., used for distributing media between two or more terminals to establish communications. There is a method of installing a call control proxy server for relaying all call control sequences transmitted and received by terminals belonging to a specific organization in operation of the SIP.

FIG. 21 shows a call control sequence (INVITE sequence) for an internal terminal installed in an internal network and an external terminal installed in an external network to establish communications using a call control proxy server. INVITE, TRYING, RINGING, OK, and ACK added to control messages in the figure represent control messages defined in the SIP. As the control messages are exchanged between the terminals, it is made possible to adjust information of the IP address, the port number, the media type, codec, the band, etc., used in communications to be established between the terminals and establish communications between the terminals.

For example, to establish audio communications in a sequence in FIG. 21, the following information is contained in a control message for determining the source IP address and the source port number or the destination IP address and the destination port number:

m=audio 49170 RTP/AVP 0
c=IN IP4 224.2.17.12

This description format is a description format standardized in IETF, an Internet protocol standardization organization as SDP (Session Description Protocol). The row of m=indicates information concerning media. Audio indicates the media type, 49170 indicates the port number, and RTP/AVP 0 indicates the format of transport and payload. The row of c=indicates information concerning connection. IN indicates the Internet, IP4 indicates IPv4, and 224.2.17.12 indicates the IP address used for connection.

In FIG. 21, when the call control proxy server receives ACK, it can know information of the source IP address and the destination IP address and the destination port number.

The call control proxy server can use the set information of the source IP address, the destination IP address, and the destination port number to control the packet filtering unit. This method is called a packet filtering unit control method using a call control proxy server. This method, however, cannot be used in a mobile IP environment described just below:

(Mobile IP Environment)

The mobile IP is a technology for making it possible to continue once established communications without break in a situation in which the IP address changes because of a move or disconnection from a network and re-connection thereto. The mobile IP is standardized in IETF and the details of the protocol are defined in RFC3775 (IPv6) and RFC3344 (IPv4).

FIG. 22 describes the operation of the mobile IP. The configuration in FIG. 22 includes a mobile terminal (also called MN (Mobile Node)) 201, a home agent (HA) 202 of a server for performing move management, a home network 205 to which the home agent 202 is connected, an external terminal (also called CN (Correspondent Node)) 203, an external network 204, a specific network (network to move to) 206 connected to the external network, a firewall 207 provided with a packet filtering unit, etc., and routers 208 and 209.

The IP address on the home network 205, for example, 2001:300:c01::2/64 is given to the mobile terminal 201 and the address is called the home address. The mobile terminal 201 establishes communications with the external terminal 203 in a state in which the mobile terminal 201 connects to the home network 205. It is assumed that the mobile terminal 201 moves to the specific network (network to move to) 206 in a state in which communications are established. Let the IP address given to the mobile terminal 201 when the mobile terminal 201 moves to the specific network (network to move to) 206 be, for example, 2001:300:c01:beef::2/64. This address is called the care address of the mobile terminal 201. To continue communications established between the mobile terminal 201 and the external terminal 203, the packet transmitted to the address of 2001:300:c01::2 (home address=old care address) from the external terminal 203 needs to be again transmitted to the new care address. In the mobile IP, if the mobile terminal 201 moves and acquires a new care address, the mobile terminal 201 sends a notification of the IP address correspondence to the home agent 202 and the external terminal 203. The notification of the IP address correspondence, namely, "change of the care address of the mobile terminal 201 from 2001:300:c01::2 to 2001:300:c01:beef::2" is called BU (Binding Update) message.

If the external terminal 203 is not compatible with the mobile IP, the packet addressed to the mobile terminal 201 is transmitted to the home address. The packet transmitted to the home address is delivered via the external network 204 to the home network 205. The packet delivered to the home network 205 is received once by the home agent 202. The home agent 202 distributes the once received packet to the care address of the mobile terminal 201, thereby delivering the packet to the mobile terminal 201. A packet from the mobile terminal 201 to the external terminal 203 is delivered in the opposite order (mobile terminal 201 to home agent 202 to external terminal 203).

If the external terminal 203 is compatible with the mobile IP, the packet addressed to the mobile terminal 201 is distributed directly to the care address. Thus, the packet delivered to the mobile terminal 201 is delivered to a specific application. This means that communications established by the mobile terminal 201 with the external terminal 203 before move can be conducted continuously even after the mobile terminal 201 moves.

However, the IP address (care address) of the mobile terminal 201 changes in a situation in which the mobile IP is operated. Thus, the rule set in the packet filtering unit before the mobile terminal 201 moves cannot be applied after the mobile terminal 201 moves; this is a problem.

Hitherto, to solve this problem, a method of controlling the packet filtering unit using information contained in a BU message sent from the mobile terminal 201 to the home agent 202 if the mobile terminal 201 moves has been available (refer to patent document 5).

FIG. 23 describes the configuration of the system in the related art. The configuration in FIG. 23 includes a first mobile terminal 301, a second mobile terminal 302, a home agent 303, a firewall management host 304, a packet filtering unit 305, an external network (Internet) 306, an ISP (Internet service provider) 307, and an authentication server 308 of the ISP 307.

Here, a situation in which the first mobile terminal 301 is brought into the external network and connection is made from the first mobile terminal 301 to the second mobile terminal 302 is assumed. The first mobile terminal 301 is connected via specific ISP 307 to the external network by dialup, etc. At this time, the authentication server 308 of the ISP 307 sends user information to the first mobile terminal 301, which then sends the user information to the firewall management host 304. If the user information is valid, the firewall management host 304 changes setting of the packet filtering unit 305 on the firewall so as to make possible communications between the first mobile terminal 301 and the home agent 303. As the operation sequence is executed, it is made possible for the first mobile terminal 301 to communicate with the second mobile terminal 302 via the home agent 303. That is, dynamic control of the packet filtering unit 305 is realized in the situation in which the mobile IP is operated.
Patent document 1: JP-A-2004-38557
Patent document 2: JP-A-2001-313640
Patent document 3: JP-A-2003-229893
Patent document 4: JP-A-2003-229915
Patent document 5: JP-A-10-70576

DISCLOSURE OF THE INVENTION

Problems to be Solved by the Invention

However, in the system in the related art shown in FIG. 23, the packet filtering unit 305 cannot limit access in IP address and port number pair units and thus if an attacker captures the first mobile terminal 301, it is made possible for the attacker to attack all services of the home agent 303 and the second mobile terminal 302; this is a problem.

The system in the related art can be applied only if the first mobile terminal 301 is taken out, and a framework for opening communications from the external terminal on the external network is not included. This means that a mechanism for opening valid communications approved by the network manager, etc., of the internal network is not provided.

To monitor unauthorized access in communications wherein access is granted in the system in the related art, there is a possibility that various communications will be conducted between the first mobile terminal 301 and the second mobile terminal 302 and thus a system for detecting the monitored packet sequence deviating from normal access cannot be used and unauthorized access must be monitored according to a system for detecting the monitored packet sequence showing a sign of unauthorized access. Thus, there is a problem of being hard to detect unknown attack.

It is therefore an object of the invention to provide a firewall system and a firewall control method for making it possible to allow only communications in a narrower range to pass through by performing packet filtering in address and port number pair units even in a situation in which mobile network communications are operated and making it possible to open communications not only when a mobile terminal in an internal network moves to an external network, but also when a different terminal connected to the external network communicates with a terminal in the internal network.

It is also an object of the invention to provide a firewall system and a firewall control method that can substantially detect unknown attack by monitoring a packet sequence of communications determined by the media type and detecting unauthorized access not meeting normal access based on the normal access determination condition defined for each media type.

Means for Solving the Problems

The firewall system of the invention is a firewall system for controlling communications between an external network and an internal network, the firewall system including a call control proxy section for relaying a call control sequence for establishing communications between terminals connected to the external network or the internal network; an address correspondence information management section for managing the correspondence between new and old addresses of each terminal changed as the terminal moves or re-connects to the network; a filtering control section for setting an address and port number pair as a filtering condition of a packet permitted to pass through between the internal network and the external network based on information of the address and the port number of the terminal used for communications obtained from the call control proxy section and information of the correspondence between new and old addresses obtained from the address correspondence information management section; and a packet filtering section for allowing a packet determined based on the filtering condition containing the address and port number pair to pass through.

Accordingly, the address and port number pair is determined based on the information of the address and the port number of the terminal used for communications obtained from the call control proxy section and the information of the correspondence between new and old addresses obtained from the address correspondence information management section, and packet filtering can be controlled. Therefore, packet filtering can be performed in the address and port number pair units even in the situation in which mobile network communications are operated, and it is made possible to allow only valid communications approved by the network manager, etc., to pass through.

As one form of the invention, in the firewall system described above, the call control proxy section comprises a relay section information retention section for retaining information concerning a different trusted call control proxy section, and the filtering control section acquires information of an address and a port number in communications between terminals established via the different call control proxy section and sets a filtering condition based on the pair of the address and the port number.

Accordingly, packet filtering can also be performed in the address and port number pair units based on information from the trusted call control proxy section for communications established via the different call control proxy section.

As one form of the invention, in the firewall system described above, the filtering control section sets a filtering condition based on the most recent address and port number pair if at least one of a terminal on the internal terminal and a terminal on the external terminal moves and address information obtained from the call control proxy section or the address correspondence information management section is changed.

Accordingly, if the terminal moves and the address is changed, it is made possible to dynamically associate address information and dynamically control packet filtering in the address and port number pair units corresponding to the most recent address.

As one form of the invention, the firewall system described above includes a normal access determination condition storage section for storing a normal access determination condition defined for each communication media type; and an unauthorized access detection section for detecting unauthorized access if a passing packet does not meet the normal access determination condition based on information of the address, the port number, and the media type of the terminal used for communications obtained from the call control proxy section, information of the correspondence between new and old addresses obtained from the address correspondence information management section, and the normal access determination condition obtained from the normal access determination condition storage section.

Accordingly, it is made possible to allow only a communication packet of a specific media type established according to the call control sequence to pass through the firewall and further monitor the packet and detect unauthorized access not meeting normal access based on the normal access determination condition defined for each communication media type.

As one form of the invention, in the firewall system described above, if at least one of a terminal on the internal terminal and a terminal on the external terminal moves and address information obtained from the call control proxy section or the address correspondence information management section is changed, the unauthorized access detection section determines the normal access determination condition based on the most recent address information.

Accordingly, if the terminal moves and the address is changed, it is made possible to dynamically associate address information and detect unauthorized access based on the normal access determination condition corresponding to the most recent address.

As one form of the invention, there is provided a packet filtering unit in the firewall system described above, including a filtering control section for setting an address and port number pair as a filtering condition of a packet permitted to pass through between the internal network and the external network based on information of the address and the port number of the terminal used for communications obtained from the call control proxy section and information of the correspondence between new and old addresses obtained from the address correspondence information management section; and a packet filtering section for allowing a packet determined based on the filtering condition containing the address and port number pair to pass through.

The packet filtering unit of the invention is a packet filtering unit of the firewall system for controlling communications between an external network and an internal network, the packet filtering unit including a filtering control section for setting an address and port number pair as a filtering condition of a packet permitted to pass through between the internal network and the external network based on information of the address and the port number of the terminal used for communications obtained from the call control proxy section for relaying a call control sequence for establishing communications between terminals connected to the external network or the internal network and information of the correspondence between new and old addresses obtained from the address correspondence information management section for managing the correspondence between new and old addresses of each terminal changed as the terminal moves or re-connects to the network; and a packet filtering section for allowing a packet determined based on the filtering condition containing the address and port number pair to pass through.

Accordingly, it is made possible to determine the address and port number pair based on the information of the address and the port number of the terminal used for communications obtained from the call control proxy section and the information of the correspondence between new and old addresses obtained from the address correspondence information management section and control packet filtering.

As one form of the invention, there is provided an unauthorized access detection unit in the firewall system described above, including a normal access determination condition storage section for storing a normal access determination condition defined for each communication media type; and an unauthorized access detection section for detecting unauthorized access if a passing packet does not meet the normal access determination condition based on information of the address, the port number, and the media type of the terminal used for communications obtained from the call control proxy section, information of the correspondence between new and old addresses obtained from the address correspondence information management section, and the normal access determination condition obtained from the normal access determination condition storage section.

The unauthorized access detection unit of the invention is an unauthorized access detection unit of the firewall system for controlling communications between an external network and an internal network, the unauthorized access detection unit including a normal access determination condition storage section for storing a normal access determination condition defined for each communication media type; and an unauthorized access detection section for detecting unauthorized access if a passing packet does not meet the normal access determination condition based on information of the address, the port number, and the media type of the terminal used for communications obtained from the call control proxy section for relaying a call control sequence for establishing communications between terminals connected to the external network or the internal network, information of the correspondence between new and old addresses obtained from the address correspondence information management section for managing the correspondence between new and old addresses of each terminal changed as the terminal moves or re-connects to the network, and the normal access determination condition obtained from the normal access determination condition storage section.

Accordingly, it is made possible to monitor a communication packet of a specific media type established according to the call control sequence and detect unauthorized access not meeting normal access based on the normal access determination condition defined for each communication media type.

The firewall control method of the invention is a firewall control method for controlling communications between an external network and an internal network, the firewall control method having the steps of acquiring information of the address and the port number of a terminal used for communications from a call control proxy section for relaying a call control sequence for establishing communications between terminals connected to the external network or the internal network; acquiring information of the correspondence between new and old addresses from an address correspondence information management section for managing the correspondence between new and old addresses of each terminal changed as the terminal moves or re-connects to the network; setting an address and port number pair as a filtering condition of a packet permitted to pass through between the internal network and the external network based on the information of the address and the port number of the terminal used for communications and the information of the correspondence between new and old addresses; and allowing a packet determined based on the filtering condition containing the address and port number pair to pass through.

Accordingly, it is made possible to determine the address and port number pair based on the information of the address and the port number of the terminal used for communications obtained from the call control proxy section and the information of the correspondence between new and old addresses obtained from the address correspondence information management section and control packet filtering.

The firewall control method of the invention is a firewall control method for controlling communications between an external network and an internal network, the firewall control method having the steps of acquiring information of the address, the port number, and the media type of a terminal used for communications from a call control proxy section for relaying a call control sequence for establishing communications between terminals connected to the external network or the internal network; acquiring information of the correspondence between new and old addresses from an address correspondence information management section for managing the correspondence between new and old addresses of each terminal changed as the terminal moves or re-connects to the network; and detecting unauthorized access if a passing packet does not meet the normal access determination condition based on the information of the address, the port number, and the media type of the terminal used for communications, the information of the correspondence between new and old addresses, and a normal access determination condition defined for each communication media type and stored in a normal access determination condition storage section.

Accordingly, it is made possible to monitor a communication packet of a specific media type established according to the call control sequence and detect unauthorized access not meeting normal access based on the normal access determination condition defined for each communication media type.

Advantages of the Invention

According to the invention, there can be provided a firewall system and a firewall control method for making it possible to allow only communications in a narrower range to pass through by performing packet filtering in address and port number pair units even in a situation in which mobile network communications are operated and making it possible to open communications not only when a mobile terminal in an internal network moves to an external network, but also when a different terminal connected to the external network communicates with a terminal in the internal network. There can also be provided a firewall system and a firewall control method that can substantially detect unknown attack by monitoring a packet sequence of communications determined by the media type and detecting unauthorized access not meeting normal access based on the normal access determination condition defined for each media type.

BRIEF DESCRIPTION OF THE DRAWINGS

FIG. 14 A drawing to show a format example of a normal access sign retention table.

FIG. 15 A diagram to show the configuration of a firewall system according to a third embodiment of the invention.

Figure 1:
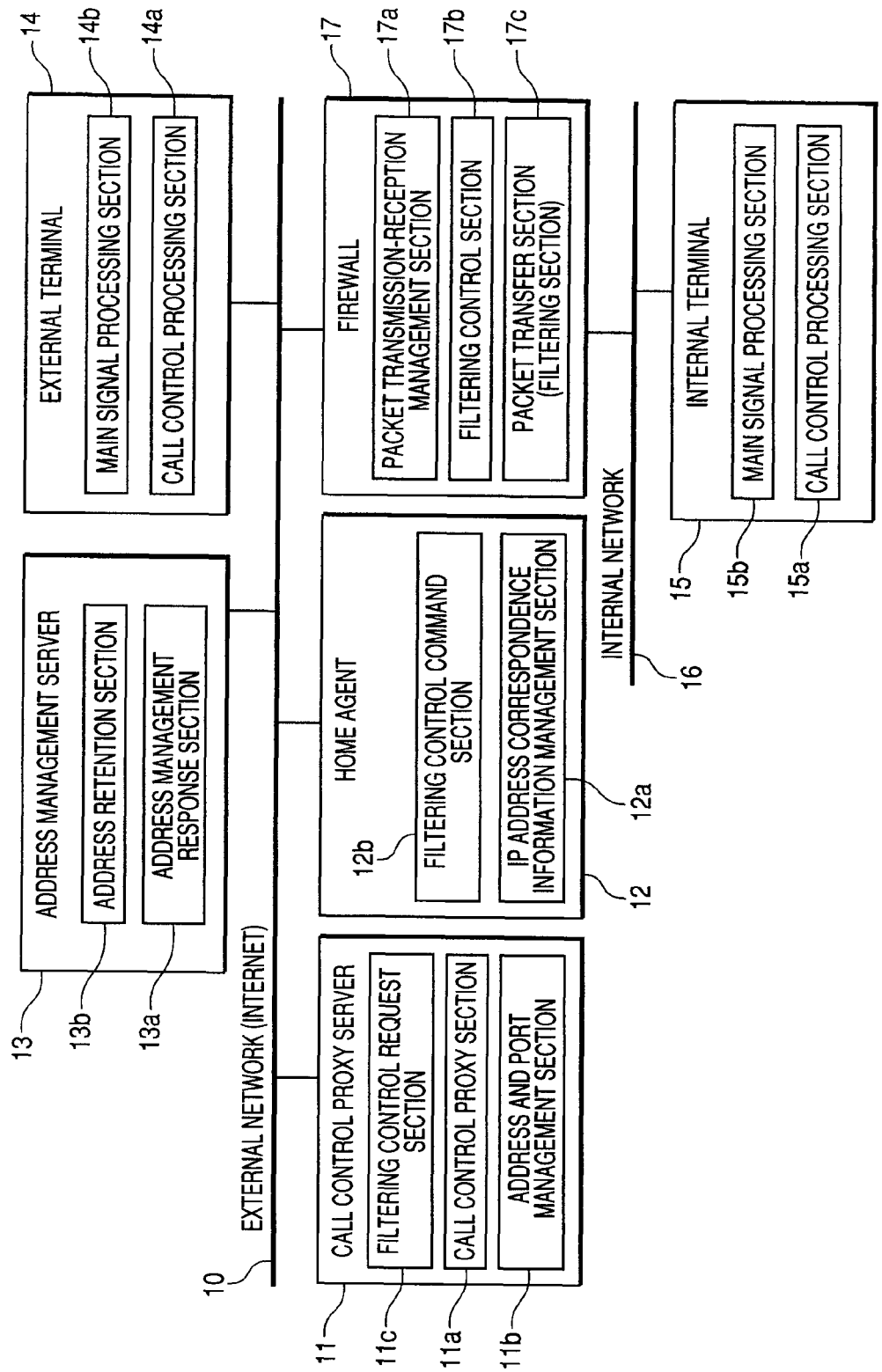
FIG. 1 A diagram to show the configuration of a firewall system according to a first embodiment of the invention.

DESCRIPTION OF REFERENCE NUMERALS 10, 406, 604 External network
11, 110, 140, 403, 403A, 503, 608 Call control proxy server
11a, 142, 812 Call control proxy section 11c Filtering control request section
12, 120, 404, 504, 602 Home agent (HA)
12a, 811 IP address correspondence information management section
12b Filtering control command section
13 Address management server
13a Address management response section
14, 402, 502, 603 External terminal (CN)
14a, 15a Call control processing section
15, 401, 501 Internal terminal
16, 407, 509 Internal network
17, 405, 130, 500, 700, 816 Firewall
17b, 814 Filtering control section
17c, 133, 815 Packet transfer section (filtering section)
111 Unauthorized access monitor control request section
121 Unauthorized access monitor control command section
131 Normal access stipulation database (normal access determination condition storage section)
132 Unauthorized access detection section
134 Unauthorized access notification section
141 Permission SIP server list retention section
400, 505, 607 Packet filtering unit
506 Unauthorized access detection unit
508 Customer premises router
601 Mobile terminal (MN)
701 Unauthorized access monitor
702 Filtering and inspection control section
703 Packet inspection section
704 Packet filtering section
705 Normal access pattern storage section (normal access determination condition storage section)
706 Unauthorized access sign notification section
800 IP mobile telephone

BEST MODE FOR CARRYING OUT THE INVENTION

First Embodiment

FIG. 1 is a diagram to show the configuration of a firewall system according to a first embodiment of the invention. The first embodiment shows the configuration for dynamically controlling a packet filtering unit in a network where data communications based on mobile IP are operated as a mobile network. In the configuration in FIG. 1, a call control proxy server 11, a home agent (HA) 12, and an address management server 13 are connected to an external network 10 such as the Internet outside a network of an enterprise, etc. An external terminal 14 is connected to the external network 10. An internal terminal 15 is connected to an internal network 16 provided in an enterprise, etc., and a firewall 17 is installed between the internal network 16 and the external network 10.

Figure 2:
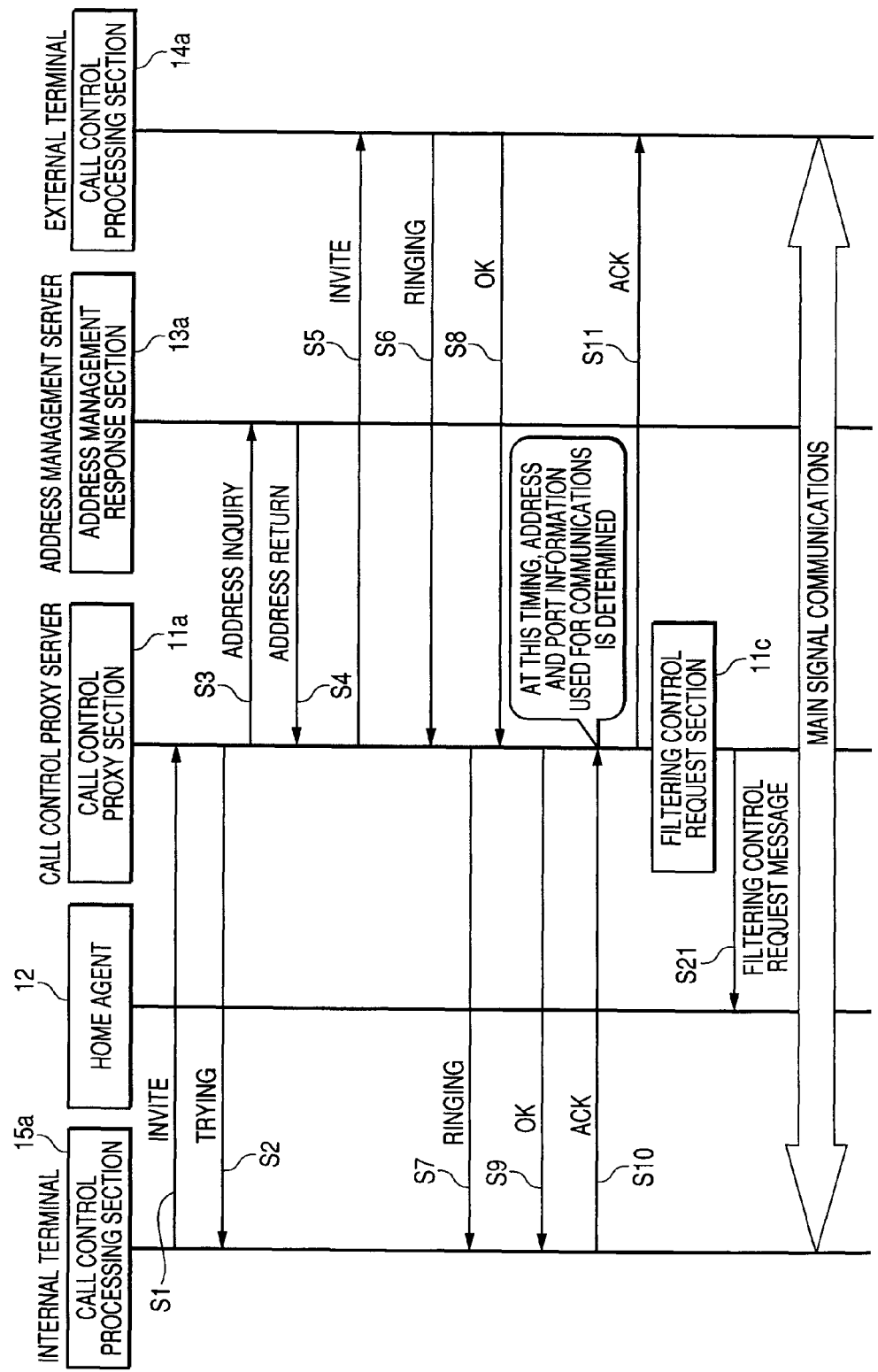
FIG. 2 A chart to show a call control sequence in the first embodiment of the invention.

FIG. 2 is a chart to show a call control sequence in the first embodiment of the invention. FIG. 2 shows the call control sequence (INVITE sequence) for the internal terminal 15 in the internal network 16 and the external terminal 14 in the external network 10 to establish communications using the call control proxy server 11. INVITE, TRYING, RINGING, OK, and ACK added to control messages in the figure represent control messages defined in SIP. As the control messages are exchanged between the terminals, it is made possible to adjust information of the IP address, the port number, the media type, codec, the band, etc., used in communications to be established between the terminals and establish communications between the terminals.

When an INVITE (session establishment request) message addressed to the external terminal 14 is sent from a call control processing section 15a of the internal terminal 15 to the call control proxy server 11 (S1), a call control proxy section 11a returns a message meaning acceptance of the session establishment request to the call control processing section 15a (S2). The call control proxy section 11a of the call control proxy server 11 sends an inquiry message about the address of the external terminal 14 to the address management server 13 (S3).

An address management response section 13a of the address management server 13 searches for the address of the external terminal 14 registered in an address retention section 13b and sends a message responding to the inquiry message with the address of the external terminal 14 to the call control proxy server 11 (S4). The call control proxy section 11a of the call control proxy server 11 sends an INVITE message as a connection request to a call control processing section 14a of the external terminal 14 (S5). Upon reception of the INVITE message, the call control processing section 14a of the external terminal 14 returns a RINGING message (S6). This RINGING message is sent to the call control processing section 15a of the internal terminal 15 through the call control proxy section 11a of the call control proxy server 11 (S7).

If the external terminal 14 responds, the call control processing section 14a of the external terminal 14 sends an OK message (S8). This OK message is sent to the call control processing section 15a of the internal terminal 15 through the call control proxy section 11a of the call control proxy server 11 (S9). The call control processing section 15a of the internal terminal 15 responds to the OK message with an ACK message (S10). This ACK message is sent to the call control processing section 14a of the external terminal 14 through the call control proxy section 11a of the call control proxy server 11 (S11).

In the call control sequence, upon reception of the ACK message from the call control processing section 15a of the internal terminal 15 (S10), address (IP address) and port number information used for communications between the internal terminal 15 and the external terminal 14 is identified and thus the call control proxy section 11a of the call control proxy server 11 temporarily stores the IP address and port number pair information used for communications in an address and port management section 11b. A filtering control request section 11c of the call control proxy server 11 supplies a filtering control request message containing the IP address and port number pair information used for communications to the home agent 12 (S21). Accordingly, filtering control processing is started.

Figure 3:
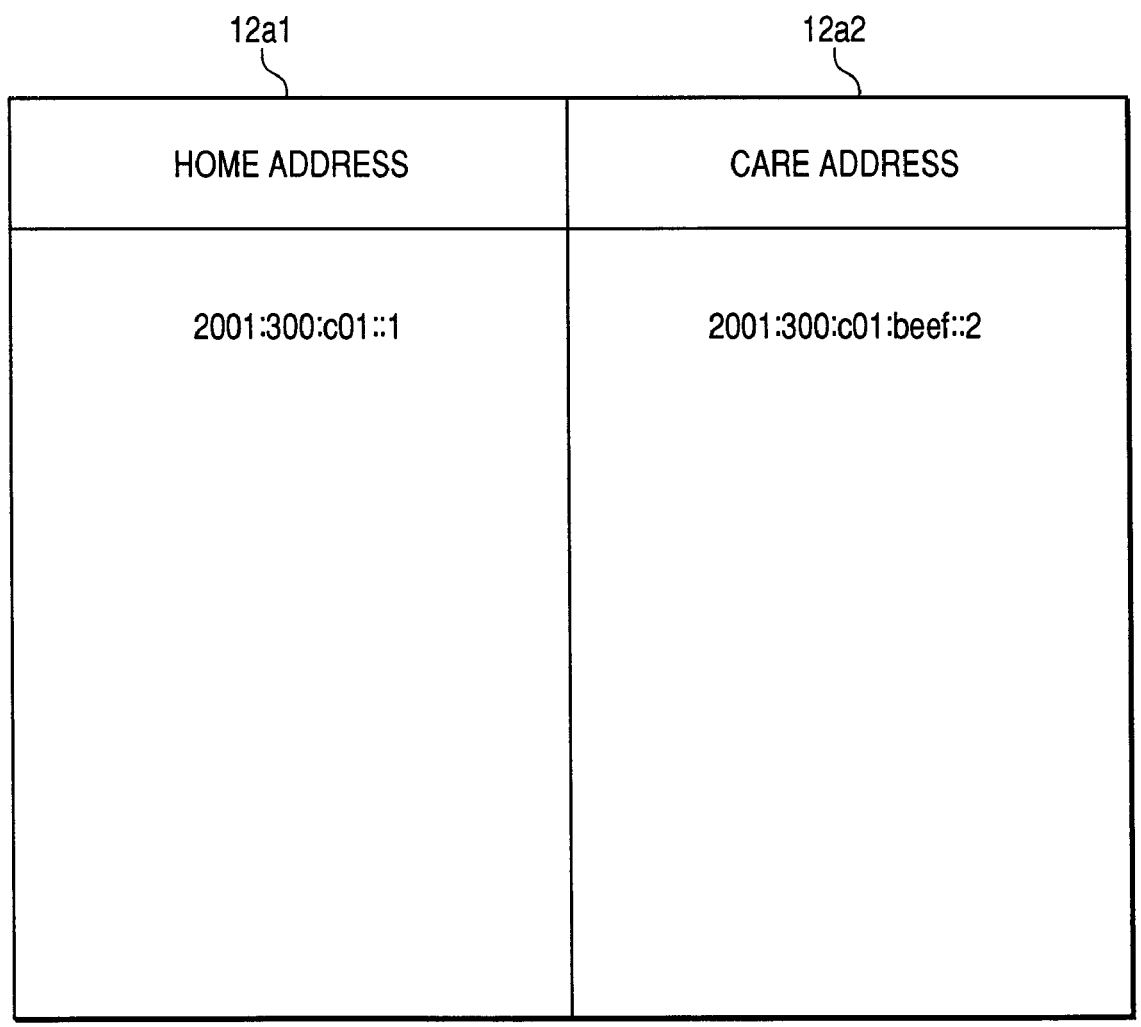
FIG. 3 A drawing to show a format example of a table indicating the correspondence between the new and old addresses of an IP address.

As shown in FIG. 1, the home agent 12 has an IP address correspondence information management section 12a and manages the correspondence between the new and old addresses of the IP address changed because of a move of the external terminal 14 or re-connection of the external terminal 14 to the network by the IP address correspondence information management section 12a. FIG. 3 shows a format example of a table indicating the correspondence between the new and old addresses of the IP address. In FIG. 3, a home address column 12a1 is an entry for retaining the home address of a terminal in the internal network and a care address column 12a2 is an entry for retaining the current care address of the terminal. When a filtering control command section 12b of the home agent 12 in FIG. 1 receives a filtering control request message containing the IP address and port number pair information used for communications, the filtering control command section 12b searches the home address column 12a1 for the IP address as a key. If the search succeeds, the filtering control command section 12b acquires the current care address from the care address column 12a2. The filtering control command section 12b determines the most recent IP address and port number pair using the care address as the most recent IP address. Then, it sends the most recent IP address and port number pair information to the firewall 17. If the search does not succeed, the filtering control command section 12b sends the IP address and port number pair information contained in the filtering control request message to the firewall 17.

When a packet transmission-reception management section 17a of the firewall 17 receives the most recent IP address and port number pair information, it supplies the pair information to a filtering control section 17b. The filtering control section 17b controls the packet transfer operation (packet filtering operation) of a packet transfer section (filtering section) 17c so as to allow the IP packet identified by the most recent IP address and port number pair information to pass through.

Accordingly, communications of a main signal (for example, a packet containing data of audio, an image, etc.,) are made possible between a main signal processing section 15b of the internal terminal 15 and a main signal processing section 14b of the external terminal 14.

Figure 4:
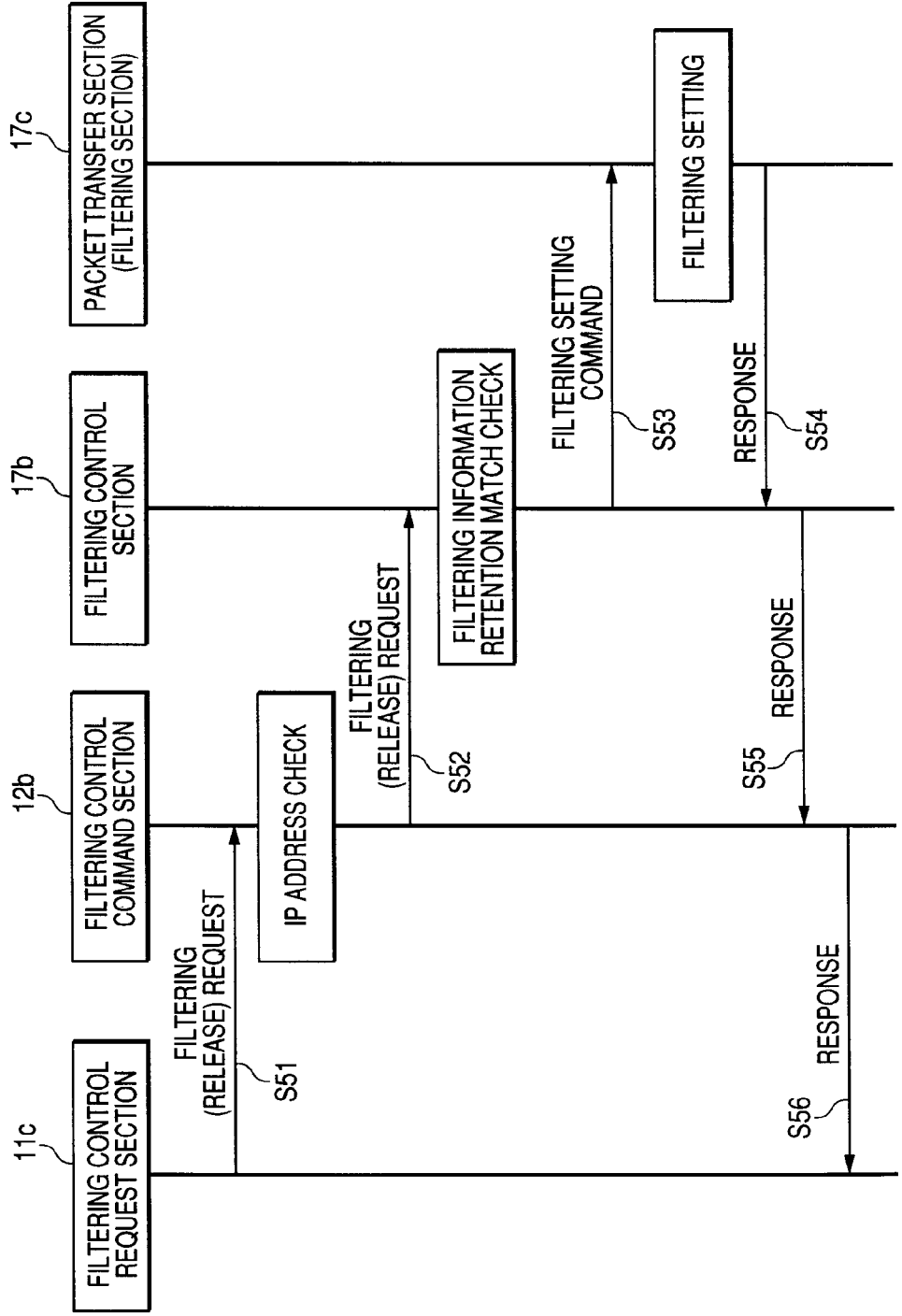
FIG. 4 A chart to show a filtering processing sequence in the first embodiment of the invention.

FIG. 4 is a chart to show a filtering processing sequence in the first embodiment of the invention. The filtering control request section 11c of the call control proxy server 11 sends a filtering request containing the IP address and port number pair information used for communications to the filtering control command section 12b of the home agent 12 (S51). The filtering control command section 12b checks whether or not the IP address is the most recent address and sends a filtering request containing the most recent IP address and port number pair information to the filtering control section 17b of the firewall 17 (S52). The filtering control section 17b retains filtering information including the most recent IP address and port number pair information, makes a match check, and sends a filtering setting command to the packet transfer section (filtering section) 17c (S53). Accordingly, a filtering condition is set. The packet transfer section (filtering section) 17c returns a response message indicating that the filtering condition is set (S54). This response message is sent through the filtering control section 17b and the filtering control command section 12b to the filtering control request section 11c (S55 and S56).

Figure 5:
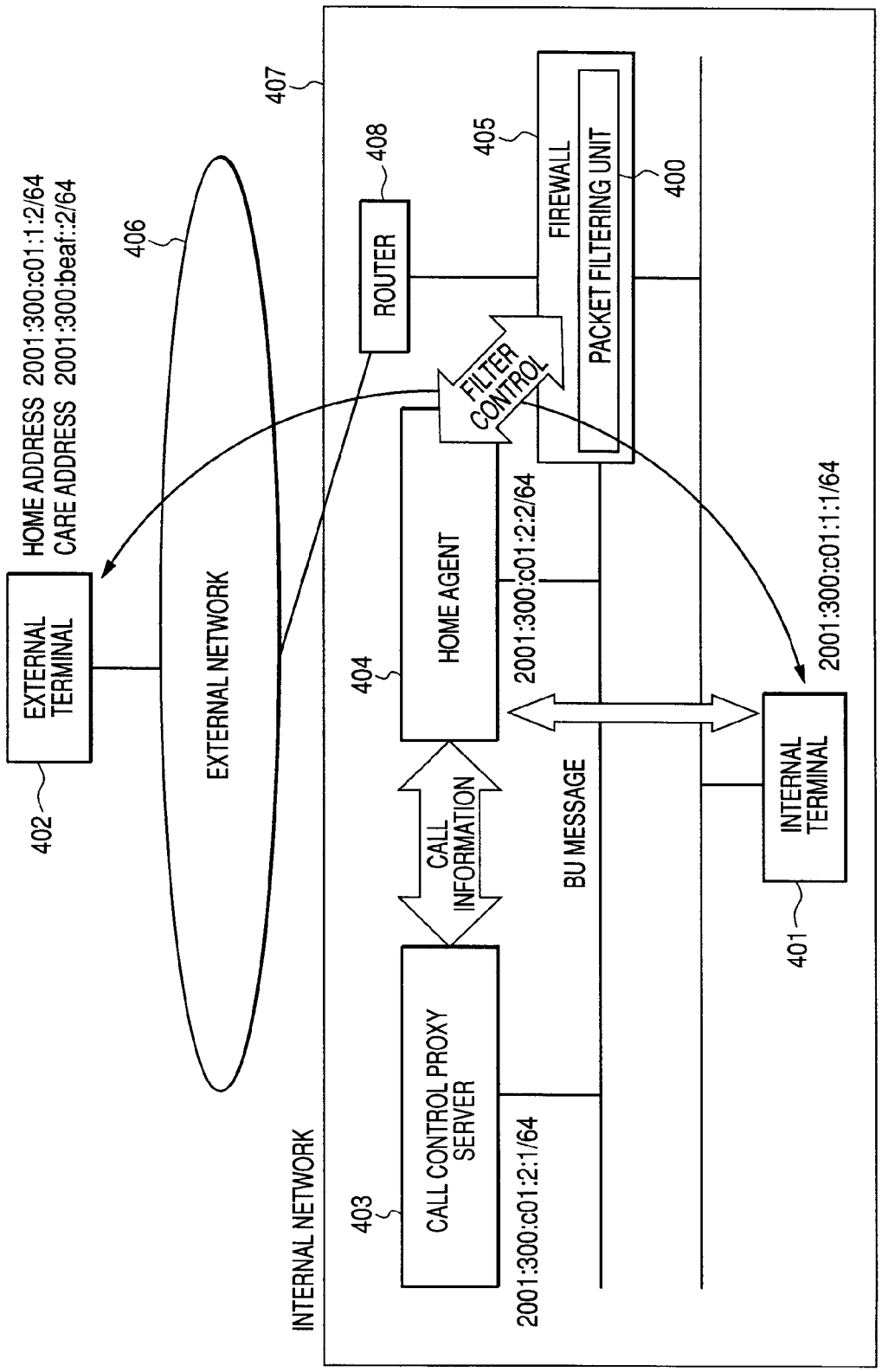
FIG. 5 A drawing to show a first operation example of the firewall system according to the first embodiment.

FIG. 5 is a drawing to show a first operation example of the firewall system according to the first embodiment. The firewall system of the first operation example has an internal terminal 401, an external terminal 402 of a mobile terminal (MN), a call control proxy server 403 having a function of a call control proxy section, a home agent (HA) 404 having a function of an address correspondence information management section, a firewall 405 including a packet filtering unit 400, an external network 406 such as the Internet, an internal network 407 installed in an enterprise, etc., and a router 408. The call control proxy server 403 and the home agent 404 are installed in a DMZ (demilitarized zone) in the internal network 407 and can be accessed from the external network 406. The internal terminal 401 connected to the internal network 407 can be accessed through the firewall 405 and the router 408 to the external network 406.

Here, it is assumed that the internal terminal 401 exchanges a call control sequence through the call control proxy server 403 to establish communications with the external terminal 402. It is also assumed that the external terminal 402 is a mobile terminal (MN) and moves to the external network 406 and acquires a care address.

As shown in FIG. 5, the call control proxy server 403 sends call information of the IP address and the port number of the internal terminal 401 and the IP address and the destination port number of the external terminal 402 determined in the call control sequence shown in FIG. 2 to the home agent 404. Here, it is assumed that the call information of the IP address and the port number of the internal terminal 401 and the IP address and the port number of the external terminal 402 acquired by the home agent 404 from the call control proxy server 403 are 2001:300:c01:1::1 and 12345 and 2001:300:c01:1::2 and 23456.

On the other hand, the home agent 404 acquires information indicating that the care address of the external terminal 402 is 2001:300:beaf::2 according to binding update information (BU message) sent by the external terminal 402 to the home agent 404. Accordingly, the home agent 404 retains the home address and the care address of the external terminal 402 in association with each other and understands that the most recent address of the external terminal 402 is the care address.

The home agent 404 sends information used for communications between the internal terminal 401 and the external terminal 402 to the firewall 405 including the packet filtering unit 400. The packet filtering unit 400 sets a filtering condition based on the acquired IP address and port number pair information and controls packet passage according to the IP address and port number pair information so as to allow an IP packet used for the communications to pass through.

That is, the packet filtering unit 400 allows a packet to pass through between (2001:300:c01:1::1, 12345) and (2001:300:beaf::2, 23456) as (IP address, port number) based on the information from the home agent 404. Specifically, the condition can be set by setting filter 1 (Allow 2001:300:c01:1::1*2001:300:beaf::2, 23456) and filter 2 (Allow 2001:300:beaf::2*2001:300:c01:1::1 12345). The source port number * is a sign meaning every port number. Here, the home agent 404 sends the care address of the external terminal 402, so that it controls the packet filtering unit 400 so as to allow a communication packet with 2001:300:beaf::2 rather than 2001:300:c01:1::2 to pass through.

That is, if a new BU message comes from the external terminal 402, the home agent 404 controls the packet filtering unit 400 so as to make possible communications between the new care address of the external terminal 402 and the internal terminal 401 and block communications between the old care address and the internal terminal 401. Specifically, assuming that the care address of the external terminal 402 sent with the new BU message is 2001:300:beaf::2, the home agent 404 controls the packet filtering unit 400 so as to allow communications between (2001:300:c01:1::1, 12345) and (2001:300:beaf::2, 23456) to pass through and shut off communications between (2001:300:c01:1::1, 12345) and (2001:300:c01:1::2, 23456).

If the call control proxy server 403 detects termination of communications between the internal terminal 401 and the external terminal 402, the internal terminal 401 or the external terminal 402 executes a call control sequence of communication termination via the call control proxy server 403. The call control proxy server 403 sends a notification of the communication termination to the home agent 404. Upon reception of the notification of the communication termination, the home agent 404 controls the packet filtering unit 400 so as to shut off an IP packet allowed to pass through to establish communications between the internal terminal 401 and the external terminal 402 so far.

If the packet filtering unit 400 monitors communication packets between the internal terminal 401 and the external terminal 402 and determines that communications are terminated, it is also possible to control the packet filtering unit 400 automatically so as to shut off a packet allowed to pass through to establish communications between the internal terminal 401 and the external terminal 402 so far.

According to the first operation example, it is made possible to dynamically control packet filtering in the IP address and port number pair units in the situation in which data communications based on the mobile IP are operated.

Figure 6:
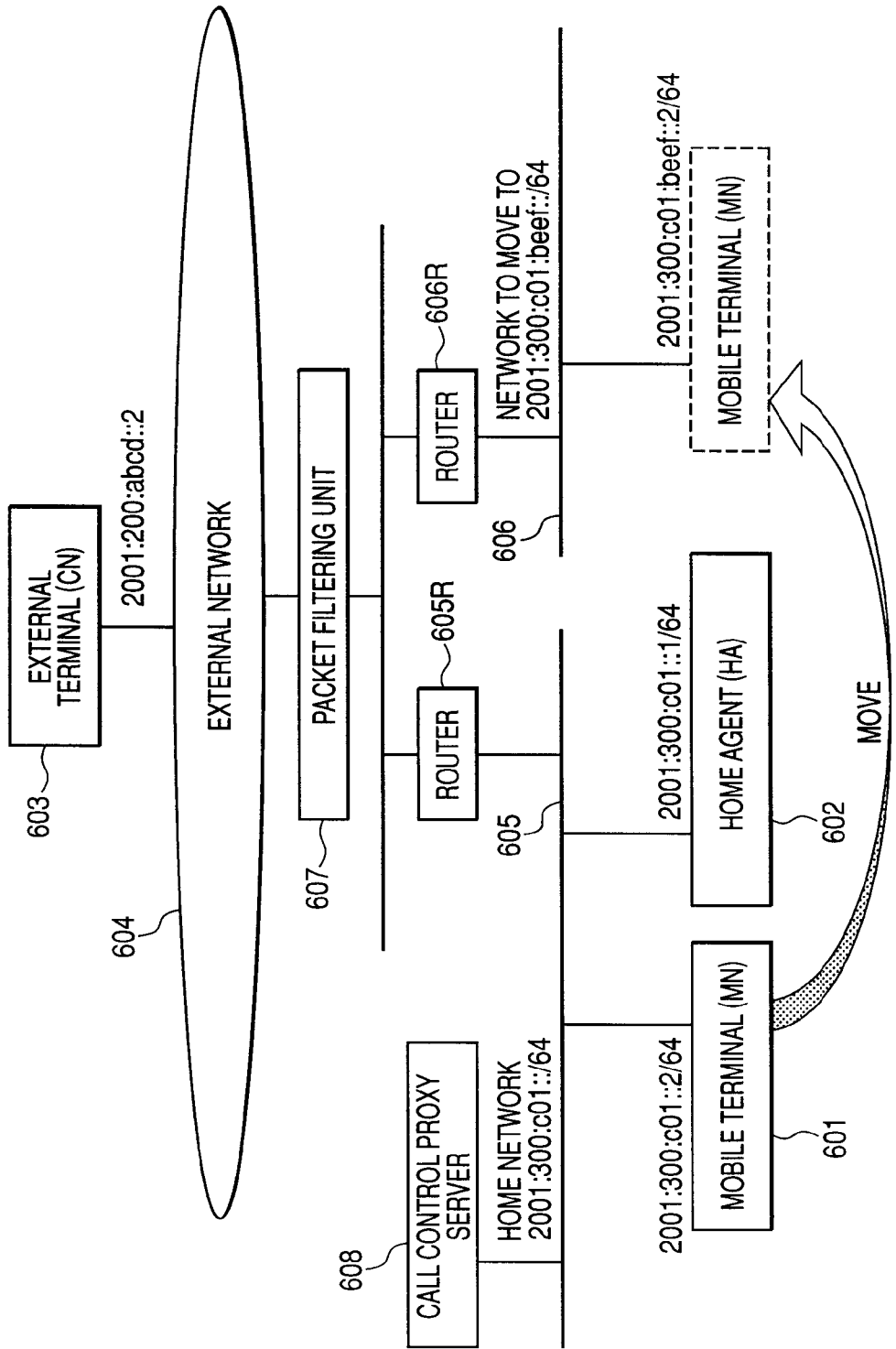
FIG. 6 A drawing to show a second operation example of the firewall system according to the first embodiment.

FIG. 6 is a drawing to show a second operation example of the firewall system according to the first embodiment. The second operation example is an example wherein data communications based on the mobile IP are operated in an internal network. The configuration in FIG. 6 has an internal home network 605, an internal network to move to 606, and an external network 604 such as the Internet, and an external terminal (CN) 603 is connected to the external network 604. The home network 605 and the network to move to 606 are connected via routers 605R and 606R. A packet filtering unit 607 as a firewall is installed between the routers 605R and 606R and the external network 604. A mobile terminal (MN) 601, a home agent (HA) 602, and a call control proxy server 608 are connected to the home network 605.

In the configuration, connection of the mobile terminal on the home network 605 and the external terminal 603 on the external network 604 is established through the call control proxy server 608. Further, it is assumed that the mobile terminal 601 moves to the network to move to 606 in a state in which a filtering condition of the packet filtering unit 607 is set through the home agent 602 and communications are conducted between the mobile terminal 601 and the external terminal 603.

The mobile terminal 601 acquires the move destination address (care address) in the network to move to 606 and sends the move destination address to the home agent 602. The home agent 602 supplies a filtering request containing the most recent IP address (namely, care address) of the mobile terminal 601 to the packet filtering unit 607 and changes the packet filtering condition so as to conduct communications between the mobile terminal 601 in the network to move to 606 and the external terminal 603. Accordingly, if the mobile terminal 601 moves, communications with the external terminal 603 can be continued. That is, the filtering processing sequence shown in FIG. 4 is executed with an address change notification sent from the mobile terminal 601 to the home agent 602 as a trigger. Accordingly, filtering information including the most recent IP address and port number pair information is sent from the call control proxy server 608 through the home agent 602 and the router 605R to the packet filtering unit 607. Consequently, if the mobile terminal 601 moves, it is made possible to continue communications with the external terminal 603.

According to the second operation example, if the mobile terminal moves from the home network to the network to move to, communications with the external terminal can be continued and packet filtering can be executed in the IP address and port number pair units.

According to the first embodiment described above, it is made possible to dynamically control the packet filtering operation in the IP address and port number pair units in the situation in which data communications based on the mobile IP are operated. It is also possible to open communications from an external terminal approved by the network manager, etc., by the call control proxy server 11 and execute packet filtering of communications involved in the terminal.

The call control proxy server 11 retains information concerning a different call control proxy server trusted by the network manager, etc. The call control proxy server 11 can introduce a mechanism for executing the call control sequence only if a call is via a different call control proxy server trusted when starting the call control sequence to establish communications between an internal terminal and an external terminal. For example, a method of retaining more than one host part of resource description on external network represented as aaa@sip.acompany.co.jp, for example, in URI (Uniform Resource Identifier) notation, namely, more than one sip.acompany.co.jp part, a method of retaining a list of host parts, a method of retaining description of sip.*.co.jp with regular expression applied to the representation of the host part, or a method of retaining the URI as well as the host part can be used as a method of retaining the information concerning a different call control proxy server trusted by the network manager, etc. Such a mechanism is introduced, whereby it is made possible to control so as to allow only communications established via the different call control proxy server trusted by the network manager, etc., to pass through the packet filtering unit.

In the first embodiment, there are an operating method wherein both or either of the call control proxy server 11 and the home agent 12 is installed in the external network 10 and an operating method wherein both or either of the call control proxy server 11 and the home agent 12 is installed in the internal network 16 of an enterprise, etc. In the former, a method of protecting communications between the call control proxy server 11 and the home agent 12 and communications between the home agent 12 and the firewall 17 including the packet filtering unit by authentication and encryption using TLS (Transport Level Security), IPSEC (IP security), etc., is applied, whereby it is made possible to prevent a dummy attack of another terminal on the external network and operate. Accordingly, even the operating method wherein both or either of the call control proxy server 11 and the home agent 12 is installed in the external network 10 can be operated like the operating method wherein both of the call control proxy server 11 and the home agent 12 are installed in the internal network 16 of an enterprise, etc.

Second Embodiment

Figure 7:
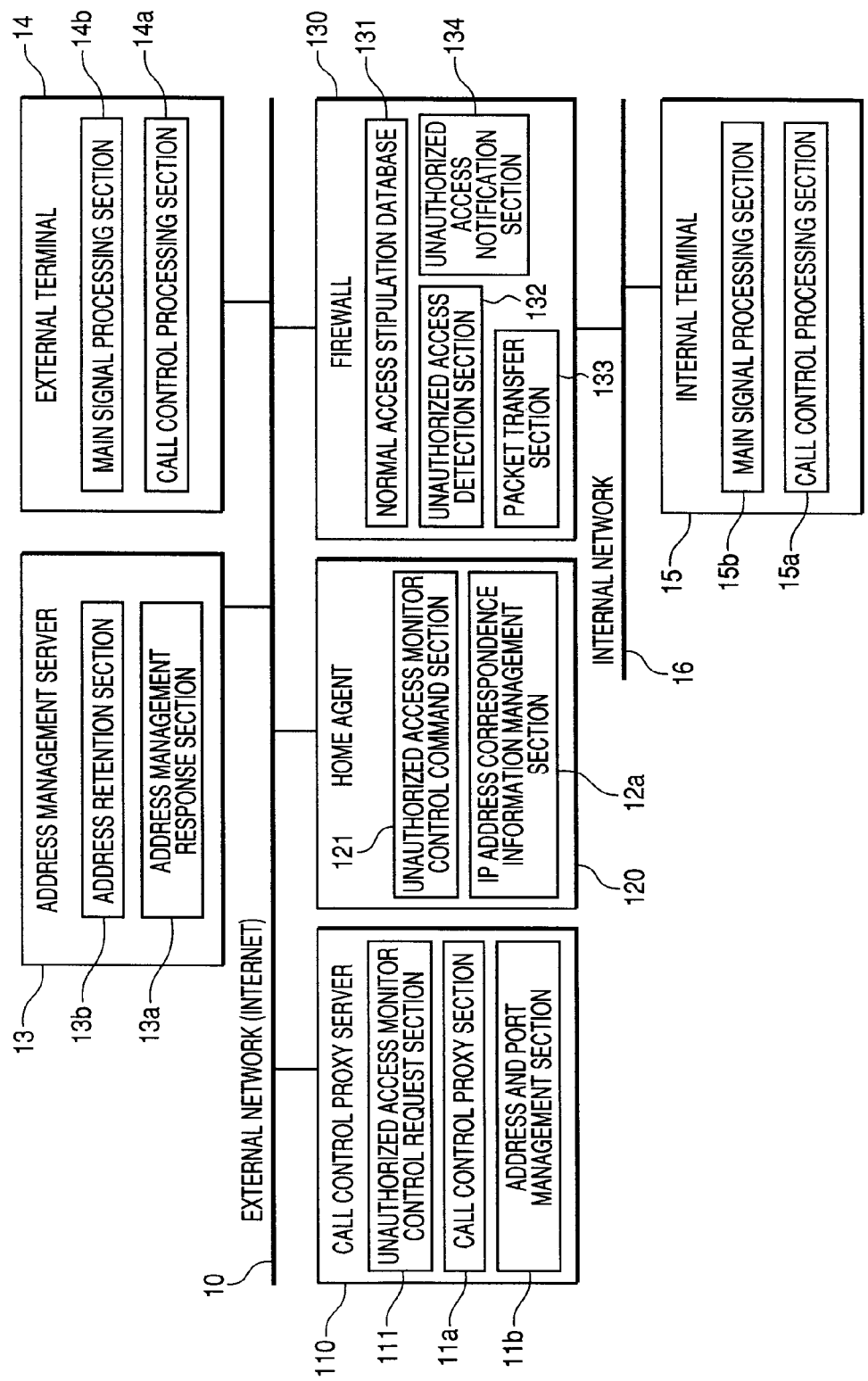
FIG. 7 A diagram to show the configuration of a firewall system according to a second embodiment of the invention.

FIG. 7 is a diagram to show the configuration of a firewall system according to a second embodiment of the invention. The firewall system according to the second embodiment is provided by adding an unauthorized access monitor function to the firewall system according to the first embodiment shown in FIG. 1. A firewall 130 has a normal access stipulation database 131 as a normal access determination condition storage section, an unauthorized access detection section 132, a packet transfer section 133, and an unauthorized access notification section 134. A call control proxy server 110 has an unauthorized access monitor control request section 111, a call control proxy section 11a, and an address and port management section 11b. A home agent (HA) 120 has an unauthorized access monitor control command section 121 and an IP address correspondence information management section 12a. Other components are similar to those of the first embodiment shown in FIG. 1.

Figure 8:
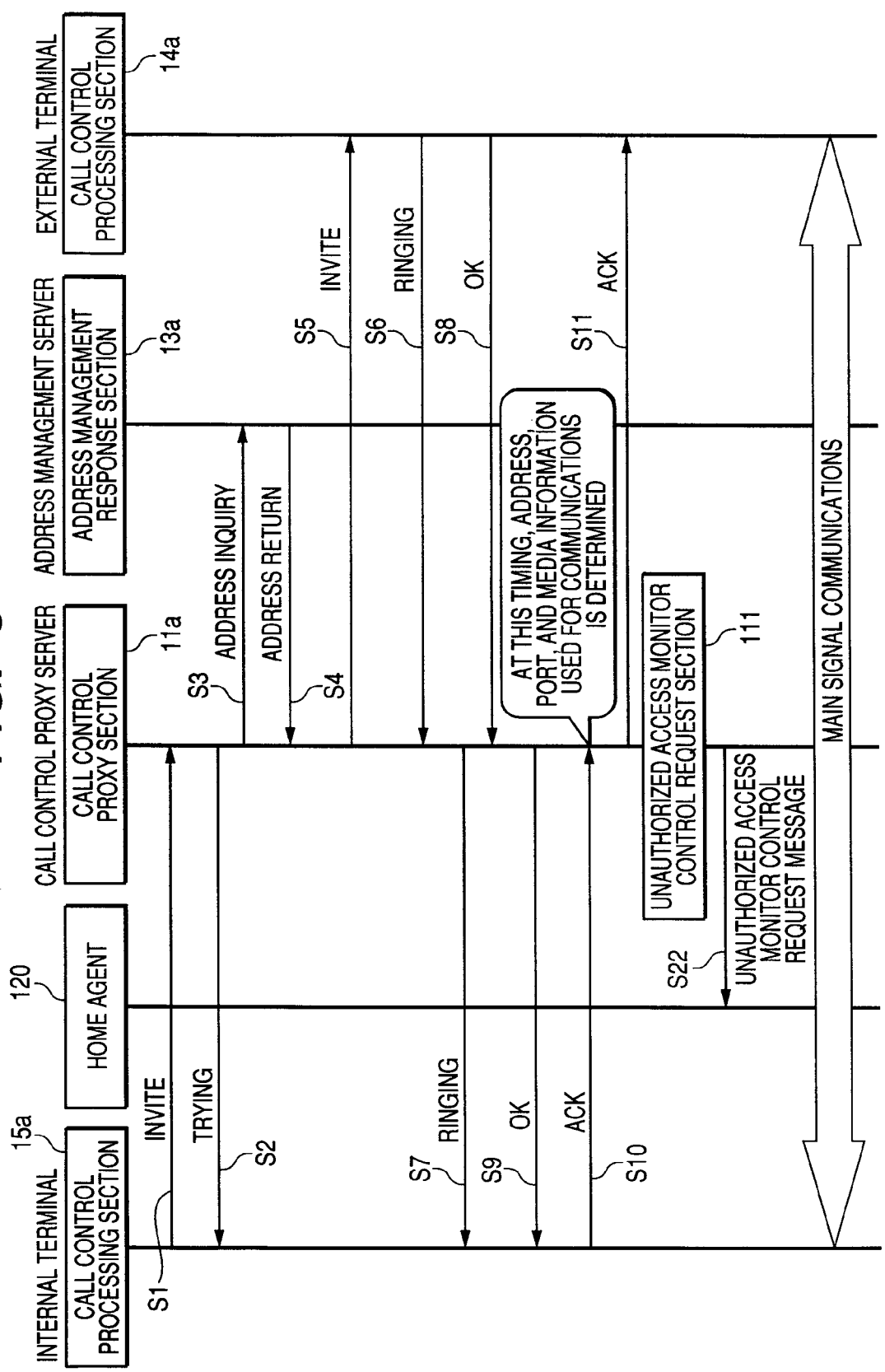
FIG. 8 A chart to show a call control sequence in the second embodiment of the invention.

FIG. 8 is a chart to show a call control sequence in the second embodiment. The sequence is provided by changing a part of the call control sequence shown in FIG. 2. In the second embodiment, when an ACK message is supplied from a call control processing section 15a of an internal terminal 15 to a call control proxy section 11a of the call control proxy server 110 (S10), information of IP address, port number, and media type used for communications is identified. The unauthorized access monitor control request section 111 of the call control proxy server 110 supplies an unauthorized access monitor control request message containing the information of IP address, port number, and media type to the home agent 120 (S22). Accordingly, unauthorized access monitor control processing is started. Other points are similar to those of the first embodiment.

Figure 9:
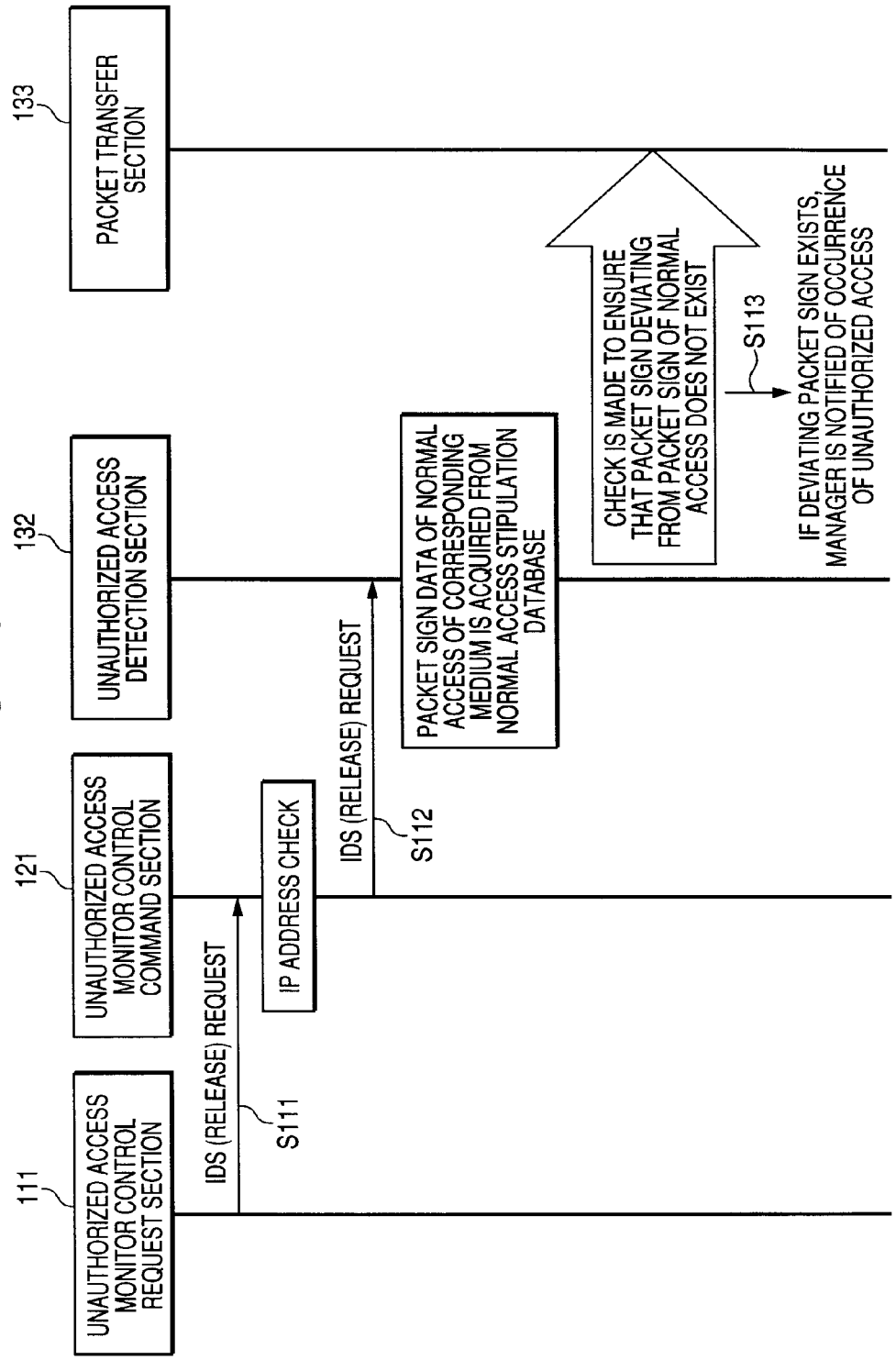
FIG. 9 A chart to show an unauthorized access monitor control sequence in the second embodiment of the invention.

FIG. 9 is a chart to show an unauthorized access monitor control sequence in the second embodiment. When information of IP address, port number, and media type used for communications, the unauthorized access monitor control request section 111 of the call control proxy server 110 supplies an unauthorized access monitor control request (IDS (Intrusion Detection System) request) to the home agent 120 (S111). The unauthorized access monitor control command section 121 of the home agent 120 checks whether or not the IP address is the most recent IP address, and supplies an unauthorized access monitor control request (IDS request) containing information of the most recent IP address, port number, and media type to the unauthorized access detection section 132 (S112). The unauthorized access detection section 132 acquires packet sign data of normal access of the corresponding medium from the normal access stipulation database 131 and checks that a packet sign deviating from the packet sign of normal access does not exist. If a deviating packet sign exists, the unauthorized access detection section 132 notifies the manager, etc., of occurrence of unauthorized access, for example, by electronic mail, etc., through the unauthorized access notification section 134 (S113).

Figure 10:
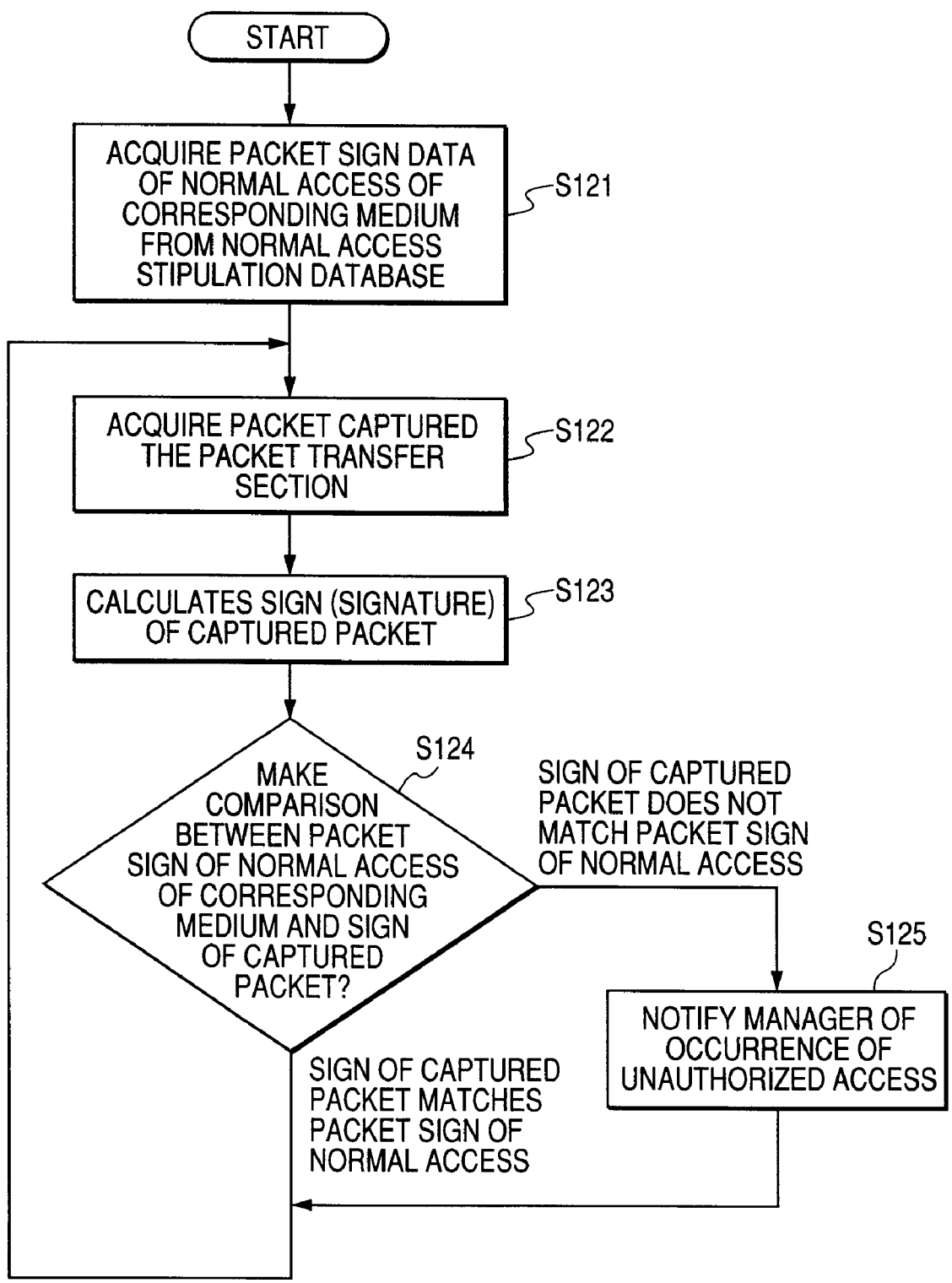
FIG. 10 A flowchart to show an unauthorized access monitor processing procedure in the second embodiment of the invention.

FIG. 10 is a flowchart to show an unauthorized access monitor processing procedure in the second embodiment of the invention. The unauthorized access detection section 132 acquires packet sign data of normal access of the corresponding medium from the normal access stipulation database 131 (step S121). The unauthorized access detection section 132 acquires the packet captured by the packet transfer section 133 (step S122) and calculates the sign (signature) of the captured packet (step S123). The unauthorized access detection section 132 makes a comparison between the packet sign of normal access of the corresponding medium and the sign of the captured packet (step S124). If the sign of the captured packet does not match the packet sign of normal access, the unauthorized access detection section 132 notifies the manager, etc., of occurrence of unauthorized access through the unauthorized access notification section 134 (S125). The processing at step S2 and the later steps is repeated until communications terminate.

Figure 11:
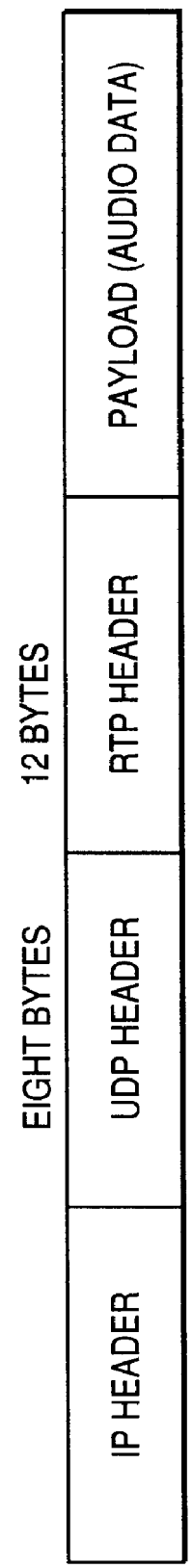
FIG. 11 A drawing to show a packet format example in audio distribution.

An implementation example of signature calculation and comparison method (processing function) at steps S123 and S124 when a packet in a format shown in FIG. 11 is inspected as a packet of normal access will be discussed. FIG. 11 is a drawing to show a packet format example in audio distribution. A combination of the following one or more conditions is used as the packet sign of normal access in the audio packet (G.711 format): (1) Sequential number in RTP header increases (or wraps around). (2) Time stamp value in RTP header increases (or wraps around). (3) Payload length is fixed (160 bytes in G.711). (4) Average arrival time interval of past N (for example, 20) packets is 20 ms (20 milliseconds). A comparison with such packet sign of normal access is made, whereby unauthorized access can be detected and the manager, etc., can be notified of occurrence of unauthorized access.

Figure 12:
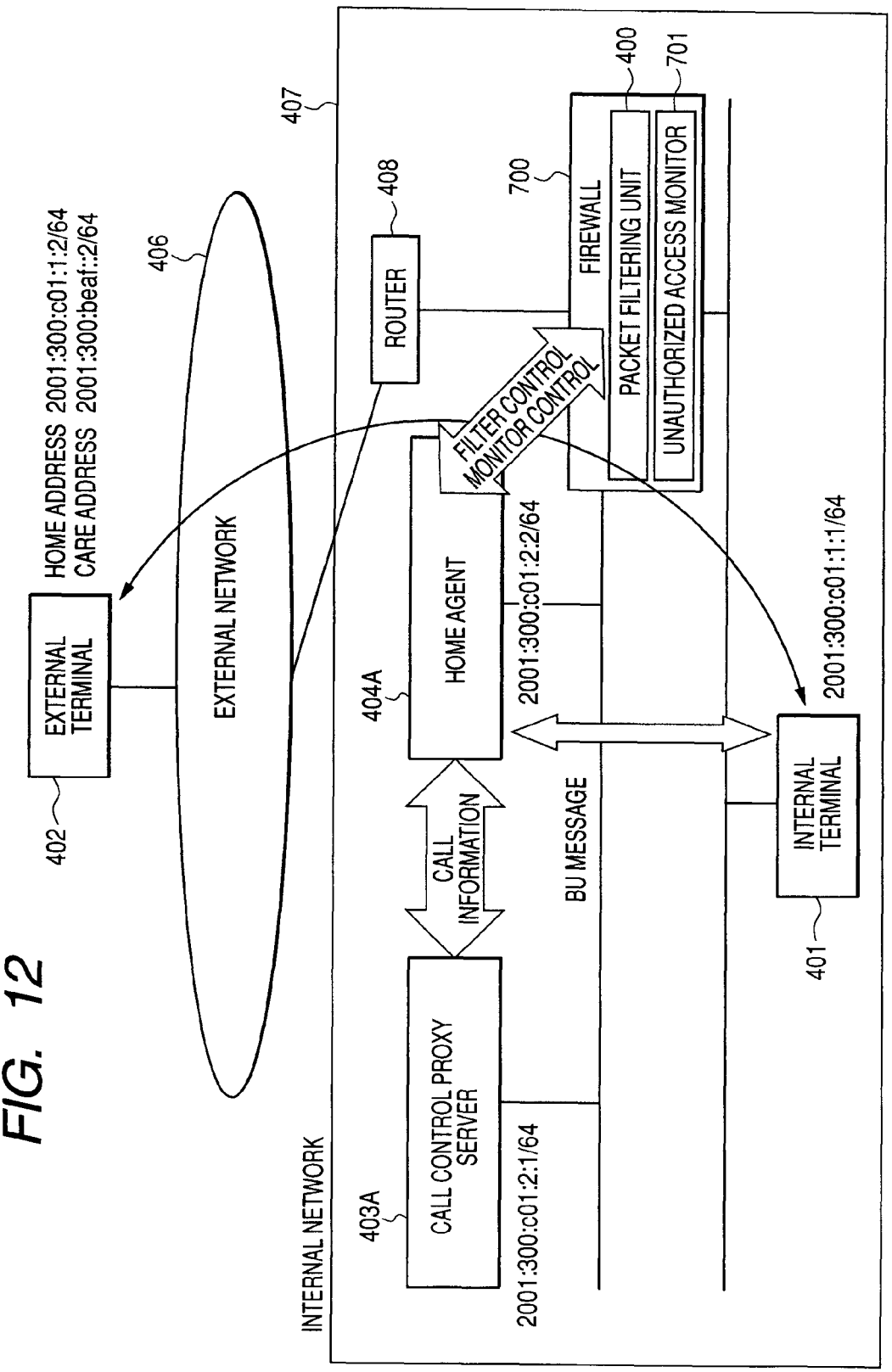
FIG. 12 A drawing to show an operation example of the firewall system according to the second embodiment.

FIG. 12 is a drawing to show an operation example of the firewall system according to the second embodiment. The firewall system of the operation example is provided by adding the unauthorized access monitor function to the first operation example of the firewall system according to the first embodiment shown in FIG. 5. A firewall 700 includes the packet filtering unit 400 shown in FIG. 5 and an unauthorized access monitor 701. In a home agent (HA) 404A and a call control proxy server 403A, a partial function concerning media type information acquisition is added. Other components are similar to those of the first operation example of the first embodiment shown in FIG. 5.

The home agent 404A acquires IP address and port number pair and media type used for communications from the call control proxy server 403A, determines the most recent IP address and port number pair and media type based on the correspondence between the new and old IP addresses, and supplies information of the most recent IP address and port number pair and media type to the firewall 700. The information of the IP address and port number pair and media type is given in a blank delimiter format of (2001:300:c01::1 12345 2001:300:c01::2 23456 m=audio 0 RTP/AVP 0,a=rtpmap:0 PCMU/8000), for example. In the format, the first item (2001:300:c01::1) is the source IP address, the second item (12345) is the source port number, the third item (2001:300:c01::2) is the destination IP address, the fourth item (23456) is the destination port number, and the fifth item (m=audio 0 RTP/AVP 0,a=rtpmap:0 PCMU/8000) is a character string indicating the media type as row descriptions stipulated in the SDP (Session Description Protocol) described above are concatenated by a comma (,).

When the communication media type is determined, the unauthorized access monitor 701 changes the inspection operation in response to the media type. Specifically, the character string indicating the media type of the information of the IP address and port number pair and media type described above is interpreted as the meaning stipulated in the SDP. If communications between terminals are, for example, IP telephone and G.711 is used as an audio coding system, when the packet condition in audio distribution (G.711) is not met, unauthorized access is detected and the network manager, etc., is notified of occurrence of unauthorized access using electronic mail, an instant message, IP telephone, etc.

Figure 13:
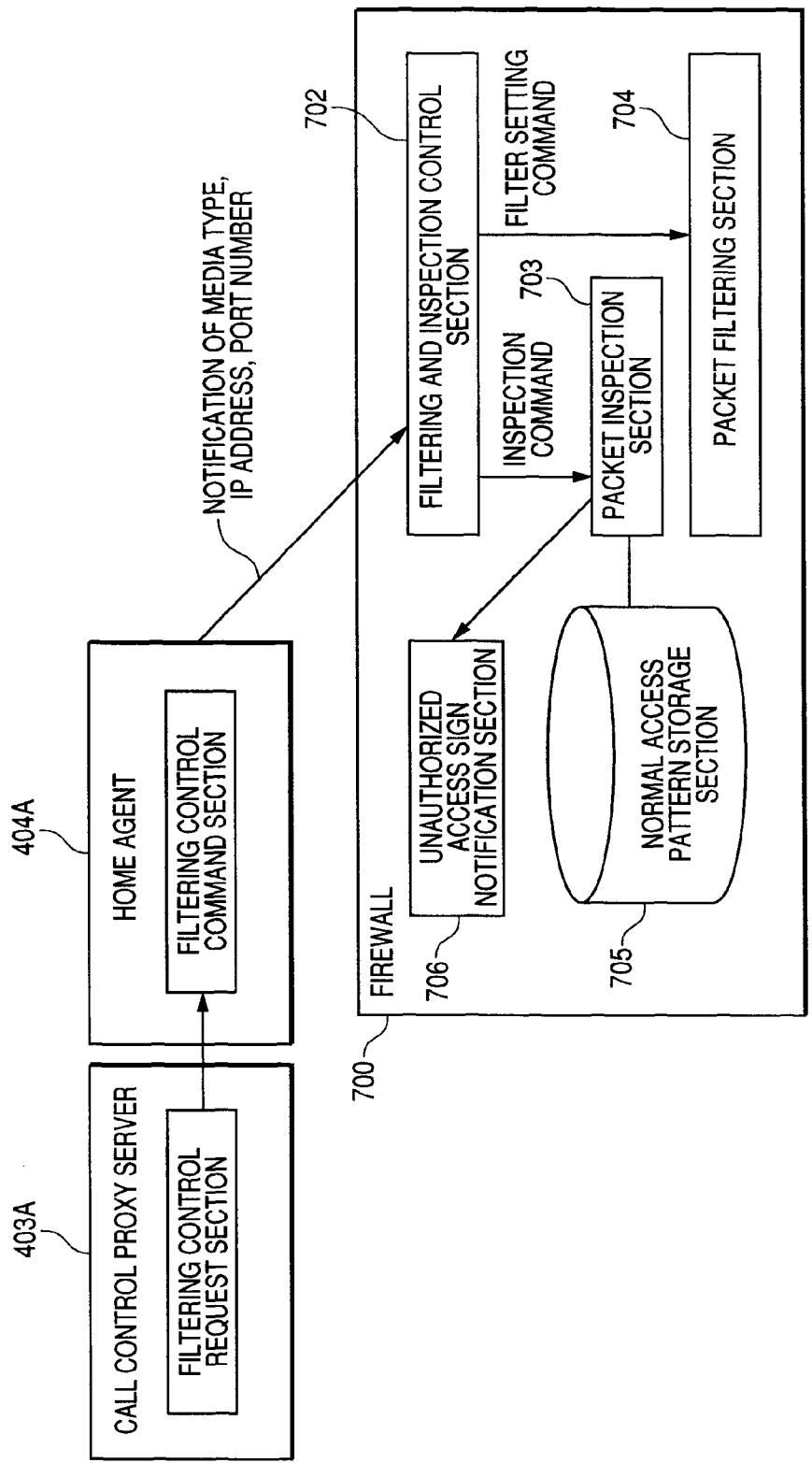
FIG. 13 A diagram to show a functional configuration example of the firewall in the operation example of the second embodiment.

FIG. 13 is a diagram to show a functional configuration example of the firewall in the operation example of the second embodiment. Upon reception of a notification of the media type, the IP address, and the port number from the home agent 404A, a filtering and inspection control section 702 in the firewall 700 gives an inspection command to a packet inspection section 703 having an unauthorized access detection function and also gives a filter setting command to a packet filtering section 704. Normal access sign (normal access determination condition) for each media type is retained in a normal access pattern storage section 705 having a function of storing normal access determination conditions. Specifically, the normal access signs are retained in a normal access sign retention table as illustrated below:

FIG. 14 is a drawing to show a format example of the normal access sign retention table. In FIG. 14, a media type column 705a is a key item for retaining the media type. A pointer column to sign inspection function 705b is an item for storing normal access determination condition. The media type described in the SDP is stored under the media type column 705a. As information to start a packet inspection function (processing), a pointer to each function and an argument applied to the function are specified under the pointer column to sign inspection function 705b.

The packet inspection section 703 acquires the function and the argument to inspect a packet from the normal access sign retention table in the normal access pattern storage section 705 using the media type as a key and applies processing with the function and the argument for each packet, thereby monitoring a packet deviating from the normal access sign of media for each IP address, port. An unauthorized access sign notification section (unauthorized access notification means) 706 notifies the network manager, etc., of occurrence of a packet deviating from the normal access sign using electronic mail, an instant message, IP telephone, etc.

Since the target communication media (audio, moving image) are determined as mentioned above, a normal access pattern for each media type is easy to create as described in the packet format example in audio distribution in FIG. 11. For example, if the moving image follows the AVP format of RTP (Real-time Transport Protocol), the inspection rule corresponding to the format can be created. For example, the integrity of the header data item and packet length, etc., is maintained and thus a normal access pattern using this nature can be created.

According to the second embodiment described above, whether or not the normal access determination condition previously defined for each media type is met can be checked based on the IP address, port number, media type information obtained according to the call control sequence and if the normal access determination condition is not met, unauthorized access can be detected and the network manager, etc., can be notified of occurrence of unauthorized access.

Third Embodiment

Figure 16:
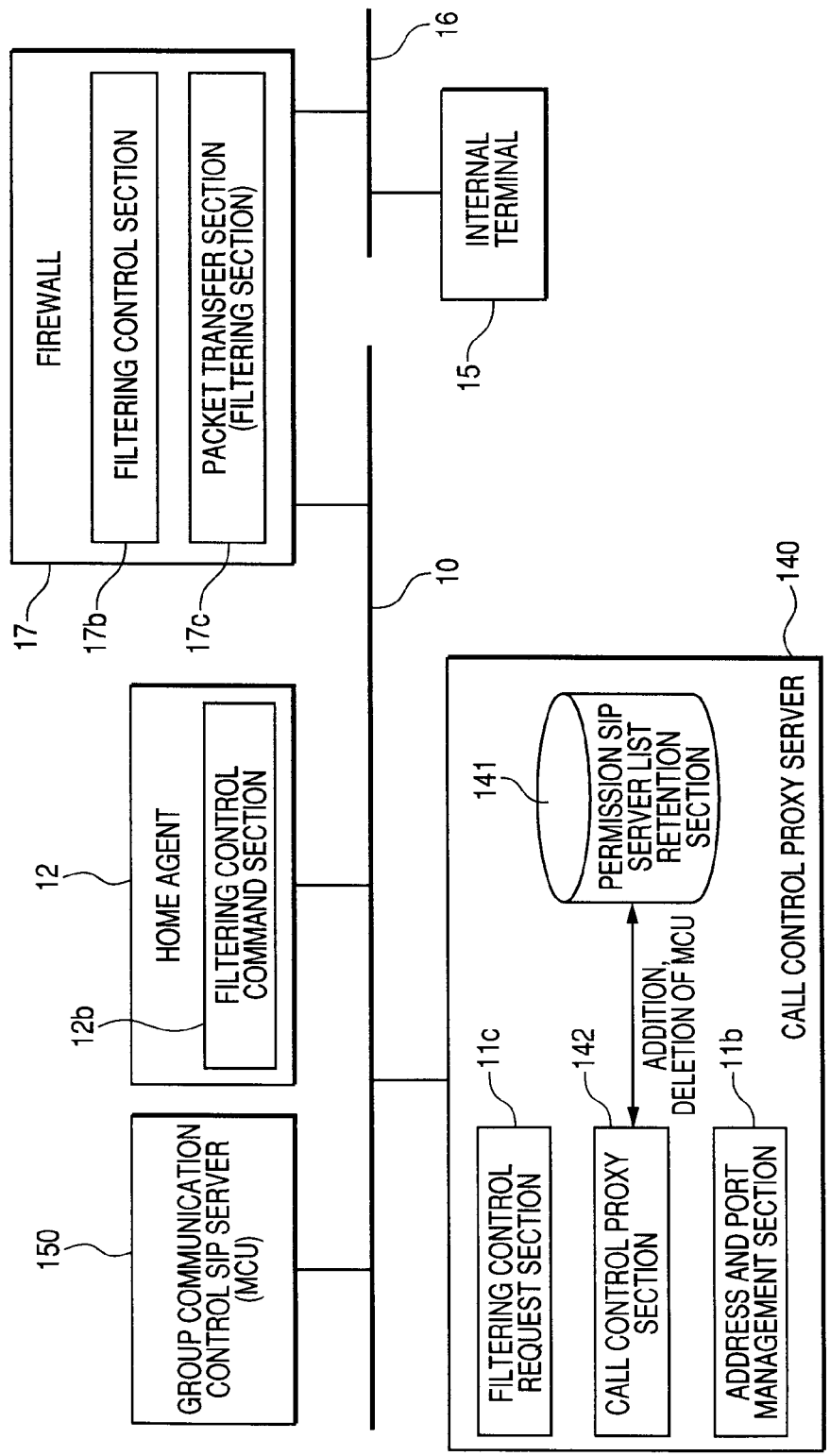
FIG. 16 A diagram to show the block configuration of the main part of the firewall system in the third embodiment of the invention.

FIG. 15 is a diagram to show the configuration of a firewall system according to a third embodiment of the invention and FIG. 16 is a diagram to show the block configuration of the main part of the firewall system in the third embodiment. The third embodiment makes it possible to automatically add a group communication control SIP server (MCU) 150 to an access control function in call control proxy server (SIP server) units based on SIP.

An address management server 13, an external terminal 14, and a group communication control SIP server (MCU) 150 are connected to an external network 10. A call control proxy server 140 and a home agent 404 are installed in a DMZ (demilitarized zone) in an internal network 16 and can be accessed from the external network 10. An internal terminal 15 connected to the internal network 16 can be accessed through a firewall 17 to the external network 10. The call control proxy server 140 includes a permission SIP server list retention section 141 having a function of retaining information concerning trusted SIP servers as a permission SIP server list.

As shown in FIG. 16, the call control proxy server 140 has a call control proxy section 142, an address and port management section 11b, and a filtering control request section 11c as well as the permission SIP server list retention section 141. The call control proxy section 142 interprets ringing when group communications are conducted between terminals as a conference is held, and adds/deletes group communication control SIP server 150 to/from the permission SIP server list. The functions of the address and port management section 11b and the filtering control request section 11c of the call control proxy server 140, the home agent 12, and the firewall 17 are similar to those of the first embodiment shown in FIG. 1.

Figure 17:
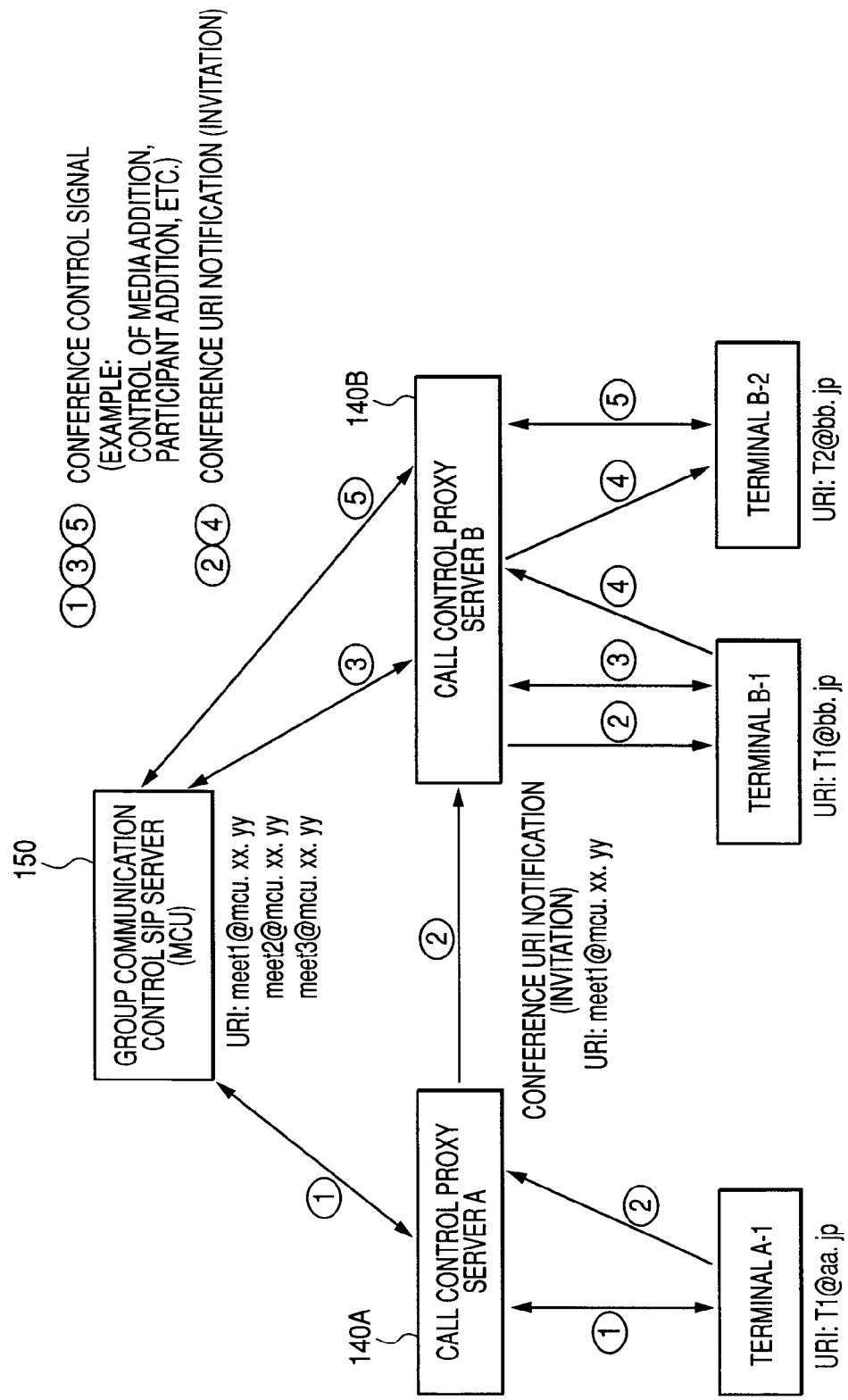
FIG. 17 A drawing to show a call control example when a conference is held using group communications among terminals.

FIG. 17 is a drawing to show a call control example when a conference is held using group communications among terminals. FIG. 17 shows call control for a terminal A-1 to allow a terminal B-1 to join one conference during joining the conference and further for the terminal B-1 to allow a terminal B-2 to join the conference. In this case, a call control proxy server A 140A accessed by the terminal A-1, a call control proxy server B 140B accessed by the terminals B-1 and B-2, and the group communication control SIP server 150 for controlling group communications in the conference are used. In FIG. 17, communications of arrows indicated by digits "1," "3," and "5" represent conference control signals concerning control of media addition, participant addition, etc., for example, and communications of arrows indicated by digits "2" and "4" represent conference URI notification (invitation). In this example, meet1@mcu.xx.yy as URI is sent from the terminal A-1 (T1@aa.jp) through the call control proxy server A 140A and the URI is sent through the call control proxy server B 140B to the terminal B-1 (T1@bb.jp), which then joins the conference. Likewise, the URI is sent from the terminal B-1 to the terminal B-2 (T21@bb.jp), which then joins the conference.

Figure 18:
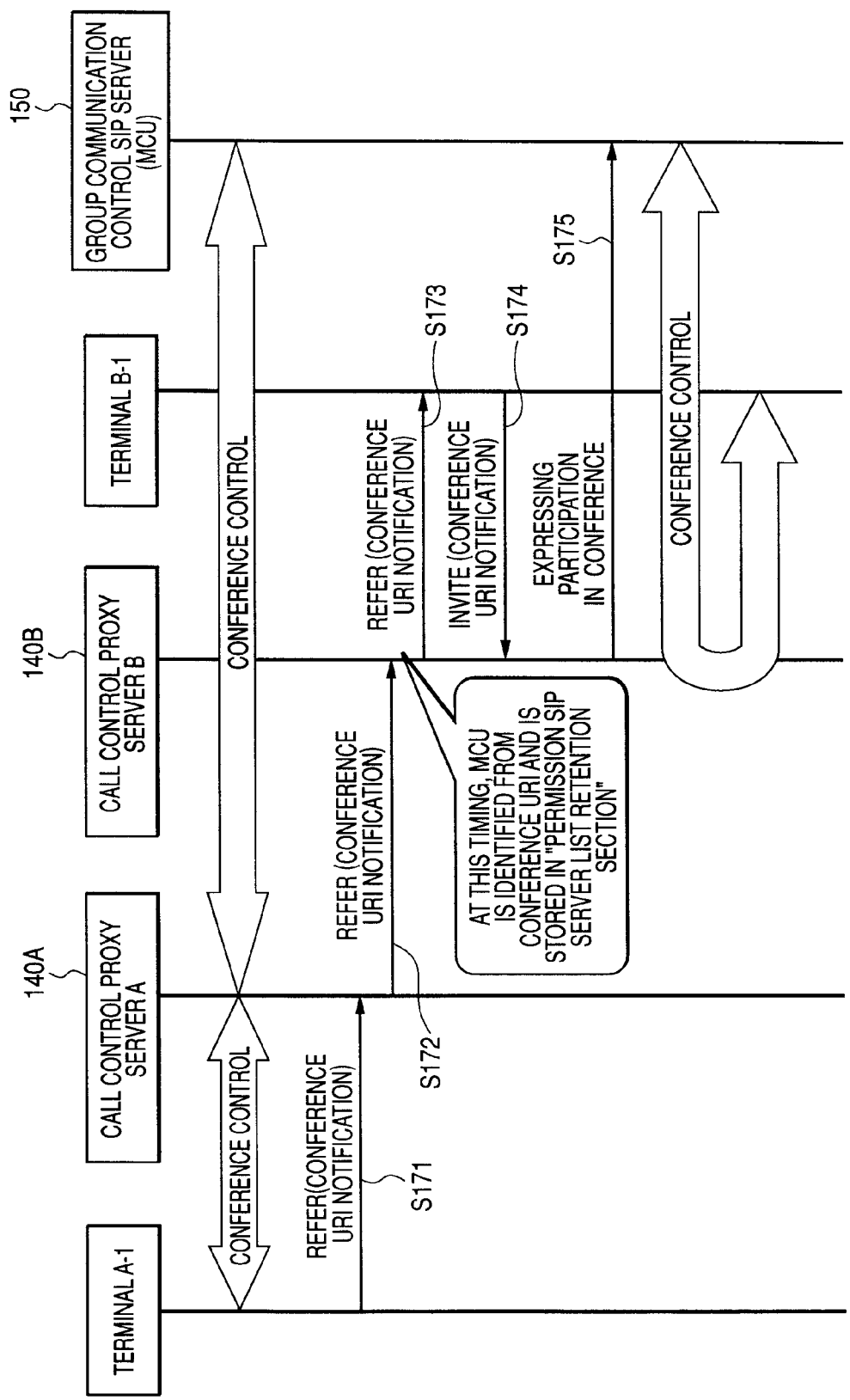
FIG. 18 A chart to show a sequence example at the conference joining time in the third embodiment of the invention.

FIG. 18 is a chart to show a sequence example at the conference joining time in the third embodiment of the invention. It is assumed that the terminal A-1 joins a conference and communication control of the conference is performed among the terminal A-1, the call control proxy server A 140A, and the group communication control SIP server 150 in the initial state. When a REFER message for sending the conference URI addressed to the terminal B-1 is issued from the terminal A-1 to the call control proxy server A 140A (S171), the call control proxy server A 140A transfers the REFER message to the call control proxy server B 140B (S172). The call control proxy server B 140B transmits the REFER message to the terminal B-1 (S173). Upon reception of the REFER message, the terminal B-1 returns an INVITE message expressing participation in the conference (S174). Upon reception of the INVITE message, the call control proxy server B 140B sends the message to the group communication control SIP server 150 (S175) and the group communication control SIP server 150 starts conference communication control with the terminal B-1. Accordingly, it is made possible for the terminal B-1 to join the conference.

When receiving the REFER message (S172) or receiving the INVITE message (S174), the call control proxy server B 140B identifies the group communication control SIP server (MCU) from the conference URI and stores information concerning the group communication control SIP server in the permission SIP server list retention section 141 as trusted SIP server information.

As described above, according to the third embodiment, the information concerning the group communication control SIP server for controlling conference communications based on group communications is added as trusted SIP server information, so that packet filtering and unauthorized access detection can be executed based on information of the IP address, the port number, the media type, etc., obtained from the added SIP server.

Fourth Embodiment

Figure 19:
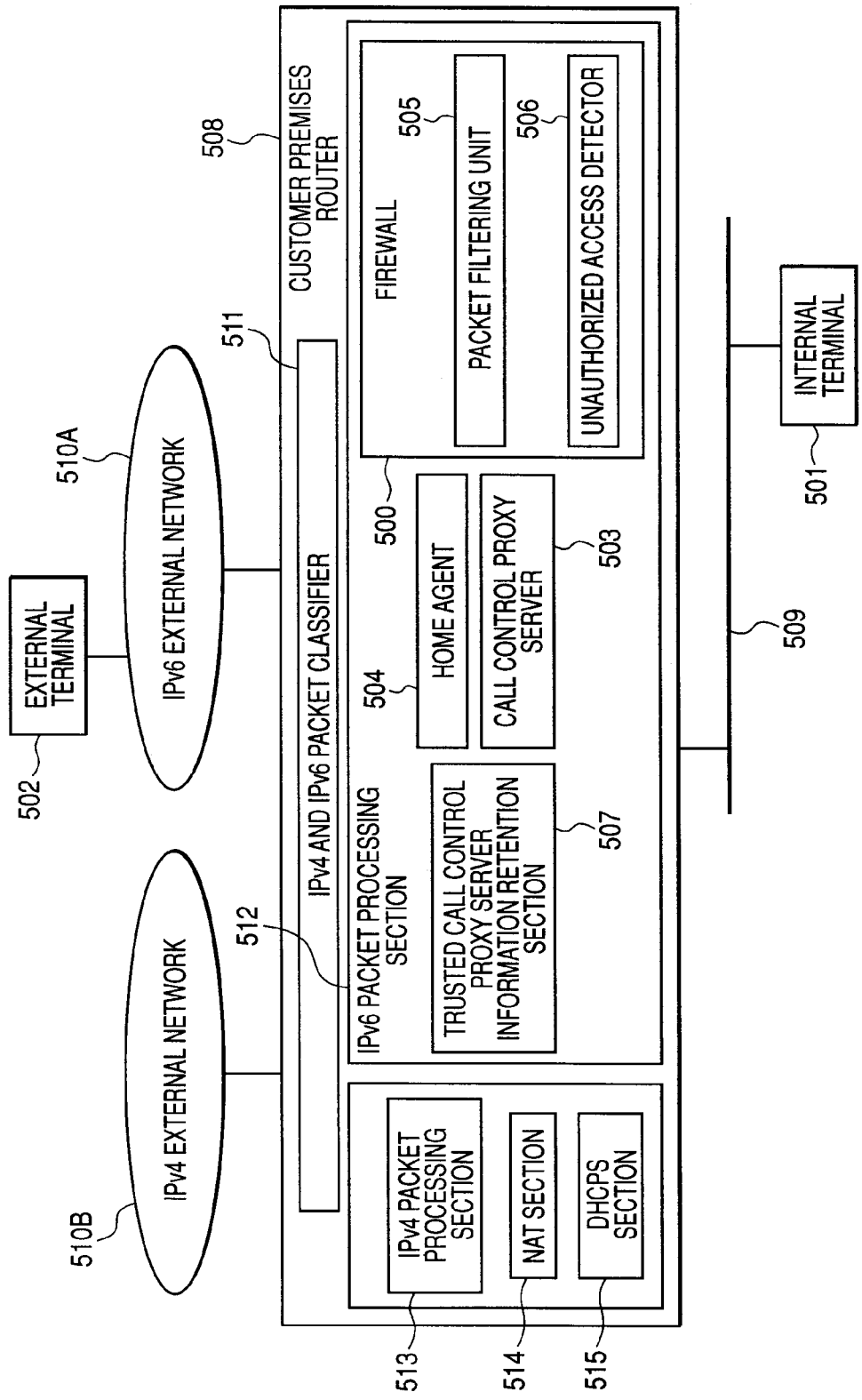
FIG. 19 A diagram to show the configuration of a firewall system in a fourth embodiment of the invention.

FIG. 19 is a diagram to show the configuration of a firewall system in a fourth embodiment of the invention. The fourth embodiment provides an example wherein the call control proxy server, the home agent (HA), and the packet filtering unit in the first embodiment are implemented as one customer premises router. A customer premises router 508 is connected to an IPv6 external network 510A, an IPv4 external network 510B, and an internal network 509 for relaying terminal-to-terminal communications. An internal terminal 501 is connected to the internal network 509 and an external terminal 502 is connected to the IPv6 external network 510A. The customer premises router 508 has an IPv4 and IPv6 packet classifier 511, an IPv6 packet processing section 512, an IPv4 packet processing section 513, an NAT section 514 for providing an NAT function, a DHCPS section 515 for providing a DHCP server function, and the like. The IPv6 packet processing section 512 is provided with a call control proxy server 503, a home agent 504, a firewall 500 having a packet filtering unit 505 and an unauthorized access detection unit 506, and a trusted call control proxy server information retention section 507.

The trusted call control proxy server information retention section 507 retains information concerning different call control proxy servers trusted by the network manager, etc. When starting a call control sequence to establish communications between the internal terminal 501 and the external terminal 502, the call control proxy server 503 accepts a call control signal only from any of the call control proxy servers retained in the trusted call control proxy server information retention section 507, thereby executing the call control sequence. Accordingly, it is made possible to perform access control in call control proxy server management units (SIP management units). Such a configuration is adopted, so that the packet filtering unit 505 can be dynamically controlled in IP address and port number pair units in a situation in which data communications based on mobile IP are operated in the customer premises router 508.

In a sequence for establishing communications with the internal terminal 501 on the internal network 509 from the external terminal 502 on the IPv6 external network 510A, the call control proxy server 503 acquires the media type used in the communications. It uses the media type to start the unauthorized access detection unit 506 responsive to the media type. The unauthorized access detection unit 506 is provided with a database stipulating normal access patterns for each media type. The unauthorized access detection unit 506 uses the media type information acquired from the call control proxy server 503 and the database of the normal access information to monitor the communication packet sequence between the external terminal 502 on the external network and the internal terminal 501 on the internal network 509. If the unauthorized access detection unit 506 detects a packet sequence deviating from the normal access in the monitoring, it notifies the network manager, etc., of occurrence of a packet sequence deviating from the normal access using electronic mail, IP telephone, etc.

Such operation is performed, whereby it is made possible for the unauthorized access detection unit 506 to monitor a packet sequence and detect unauthorized access as deviating from the normal access. Further, the normal access sign may be defined for each media type, so that it becomes easy to define the normal access. For example, distribution of audio, a moving image, etc., used in communications between the external terminal and the internal terminal is executed in accordance with the previously stipulated RTP payload format. Thus, it is easily made possible to stipulate the normal access using information of the packet length, the sequence number, the time stamp, etc., in the payload format. Therefore, it is made possible to actually operate the unauthorized access detection unit 506 for detecting deviation from the normal access.

Since the embodiment is an embodiment of applying the control method of the packet filtering unit and the unauthorized access detection unit of the invention to the customer premises router 508, a similar configuration can also be applied to a mobile terminal of a mobile telephone, a PDA, etc., including a router function and a bridge function.

As described above, according to the fourth embodiment, dynamic packet filtering in the IP address and port number pair units and easy and appropriate unauthorized access detection based on the normal access determination condition previously defined for each media type can be executed in the customer premises router, etc.

Fifth Embodiment

Figure 20:
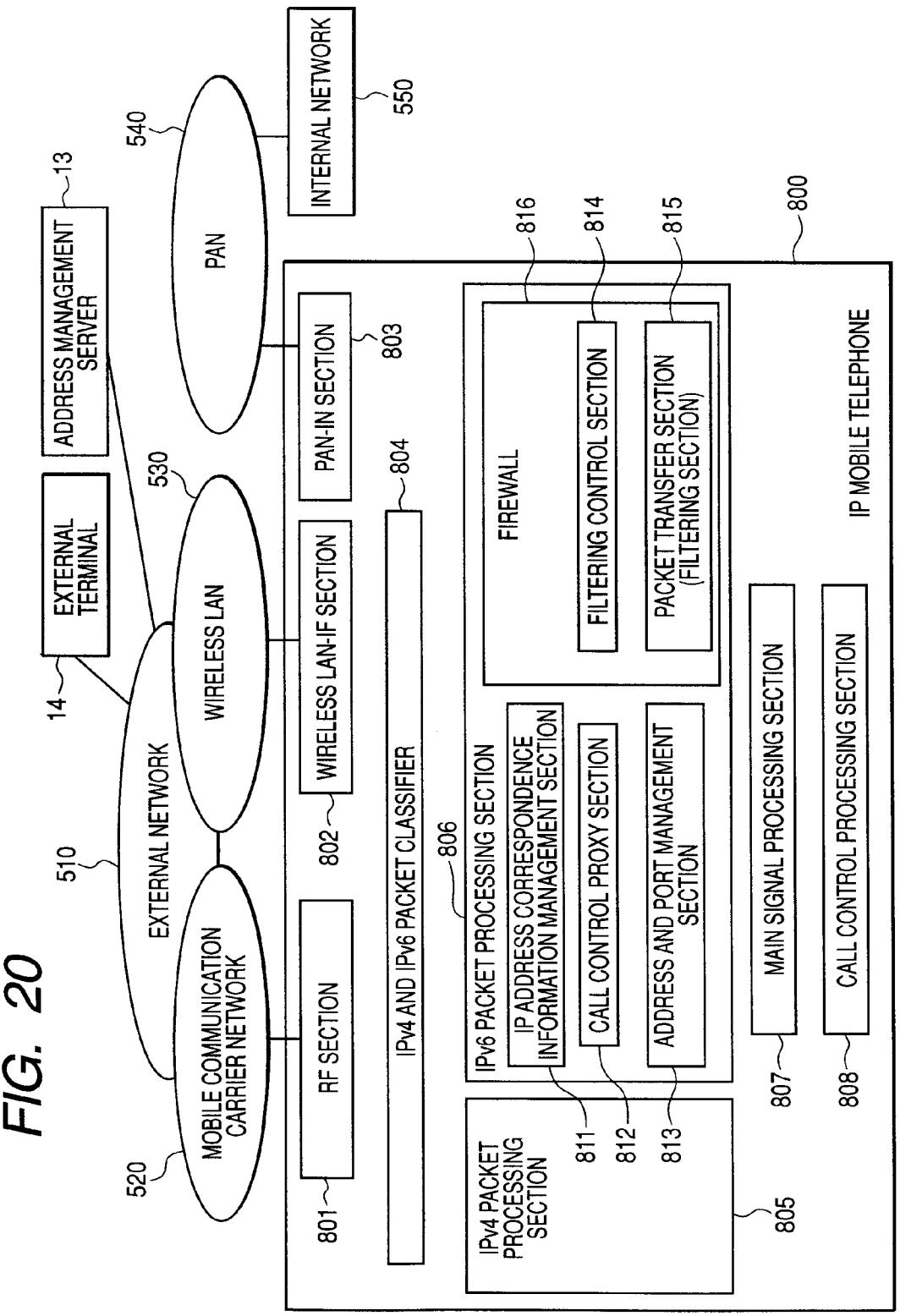
FIG. 20 A diagram to show the configuration of a firewall system in a fifth embodiment of the invention.
Figure 21:
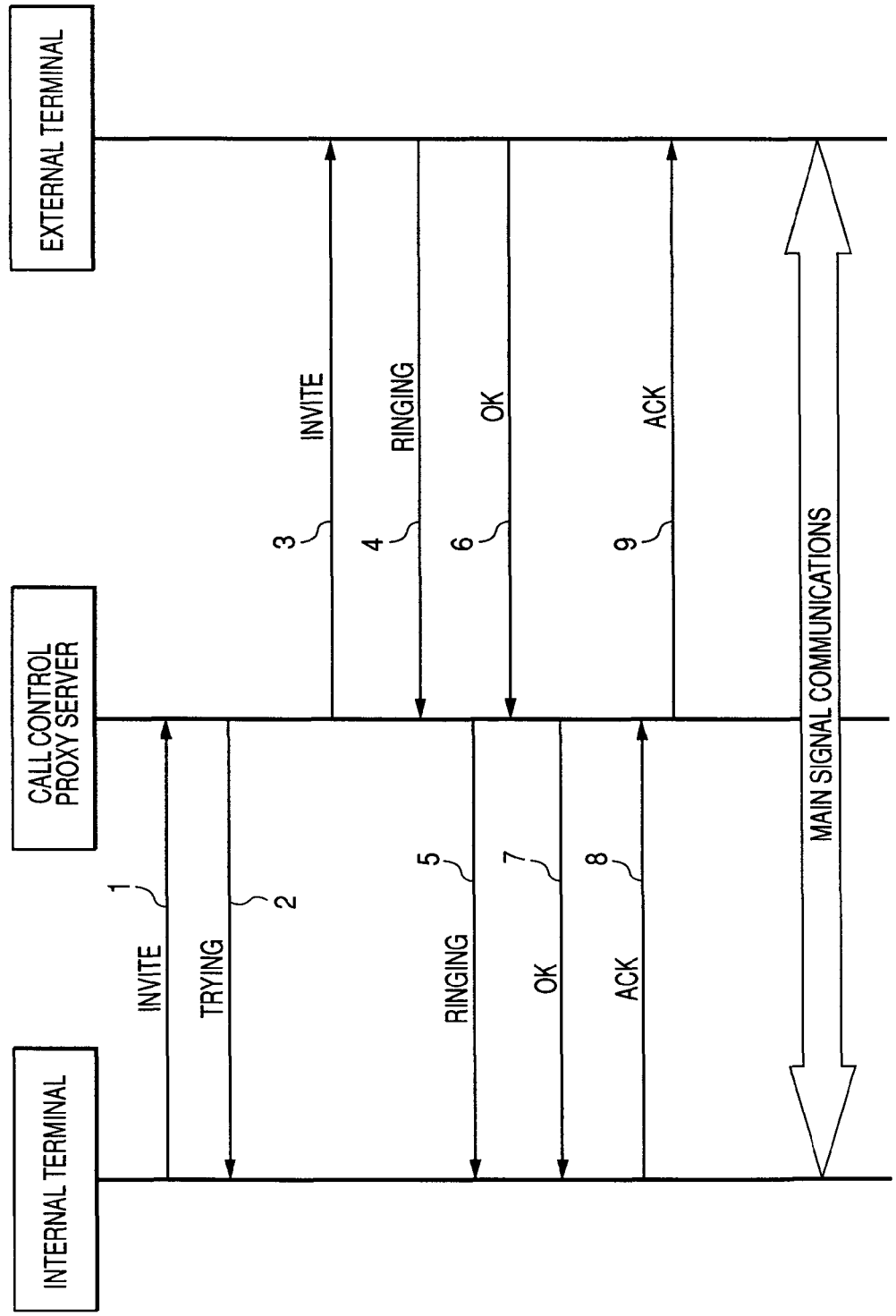
FIG. 21 A drawing to show a sequence of call control using a call control proxy server.
Figure 22:
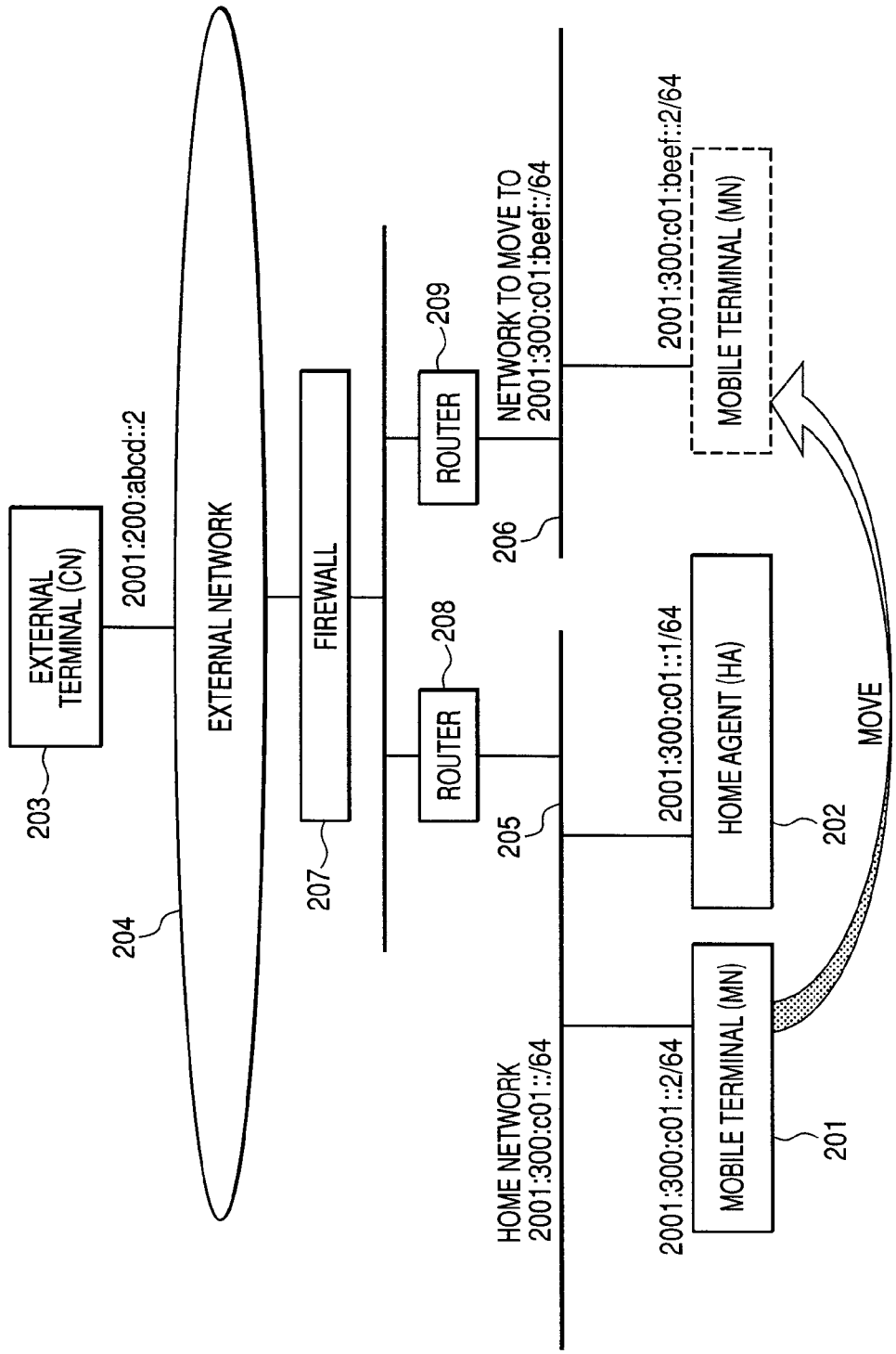
FIG. 22 A drawing to show the operation of mobile IP.
Figure 23:
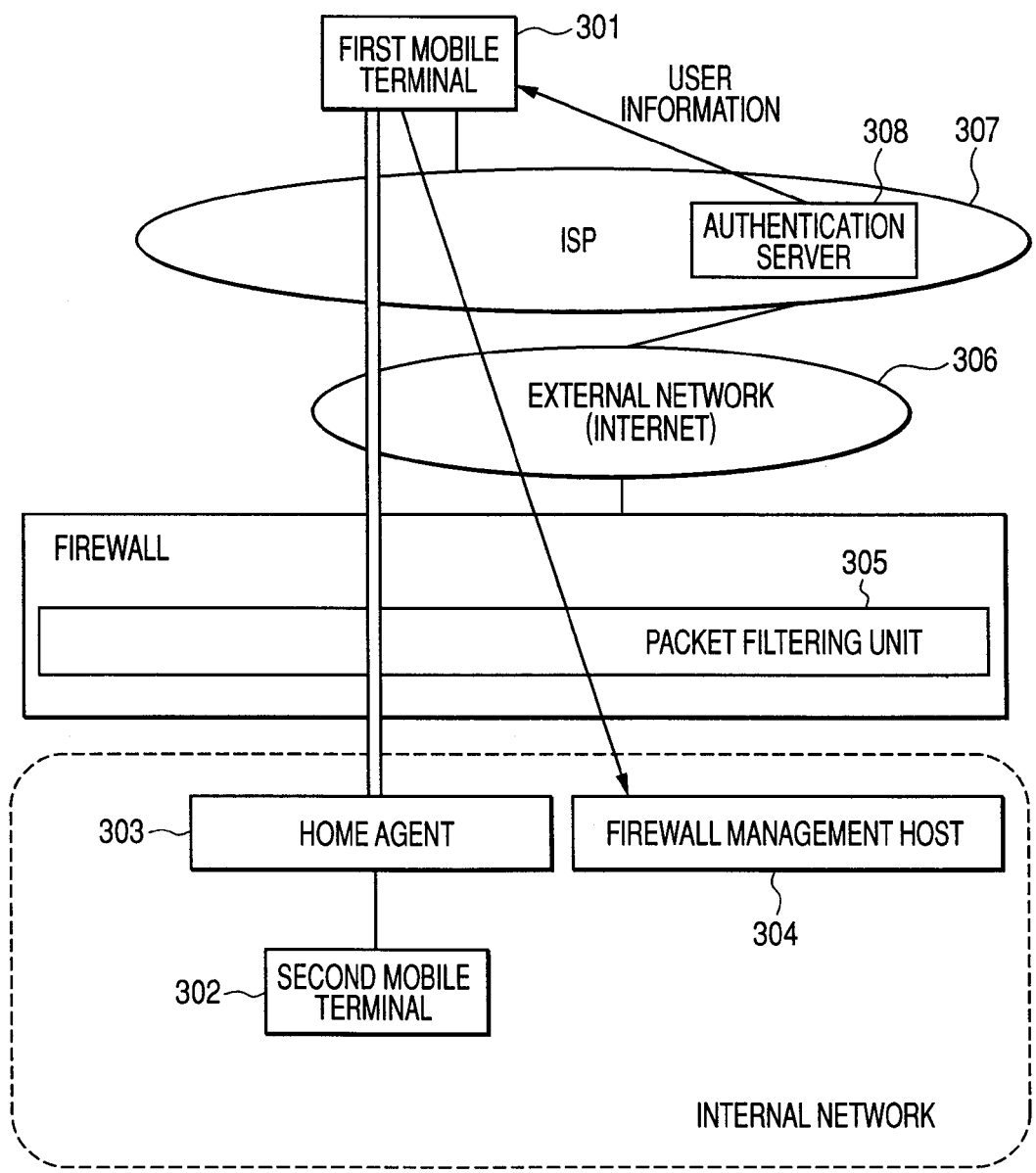
FIG. 23 A drawing to show a configuration example of a firewall in a related art.

FIG. 20 is a diagram to show the configuration of a firewall system in a fifth embodiment of the invention. The fifth embodiment provides an example wherein a firewall system according to the invention is applied to an IP mobile telephone. An address management server 13 and an external terminal 14 are connected to an external network 510 such as the Internet. The external network 510 can be connected to an IP mobile telephone 800 through a mobile communication carrier network 520 or a wireless LAN 530. The IP mobile telephone 800 is connected to an internal terminal 550 through a PAN (Personal Area Network) 540.

The IP mobile telephone 800 has a router function and has an RF section 801, a wireless LAN-IF section 802, a PAN-IN section 803, an IPv4 and IPv6 packet classifier 804, an IPv4 packet processing section 805, an IPv6 packet processing section 806, a main signal processing section 807, a call control processing section 808, etc. The IPv6 packet processing section 806 has an IP address correspondence information management section 811, a call control proxy section 812, an address and port management section 813, and a firewall 816 including a filtering control section 814, a packet transfer section (filtering section) 815, etc.

According to the configuration, in the IP mobile telephone 800 of a mobile terminal, the filtering control section 814 executes dynamic packet filtering in IP address and port number pair units based on information of IP address, port number, and media type obtained according to a call control sequence in the call control proxy section 812 and address information at the terminal moving time provided by the IP address correspondence information management section 811. Accordingly, in the IP mobile telephone 800, control can be executed so as to accept only calls of the internal terminal 550 of an IP telephone, etc., in the PAN 540, for example, through the firewall 816. The media type information provided by the call control proxy section 812 can also be used to detect unauthorized access based on a normal access determination condition previously defined for each media type.

As described above, according to the fifth embodiment, dynamic packet filtering in the IP address and port number pair units and easy and appropriate unauthorized access detection based on the normal access determination condition previously defined for each media type can be executed in the mobile terminal.

As described above, the configuration of the embodiment is applied to the firewall system installed between the internal network of an enterprise, etc., and the external network such as the Internet, whereby the packet filtering function and the unauthorized access detection function useful even in the situation in which data communications based on the mobile IP are operated can be provided. The configuration of the embodiment can also be applied to a router installed in a home, etc., a mobile terminal of a mobile telephone, a PDA, etc., having a router function that can move containing an internal network.

While the invention has been described in detail with reference to the specific embodiment, it will be obvious to those skilled in the art that various changes and modifications can be made without departing from the spirit and the scope of the invention.

This application is based on Japanese Patent Application (No. 2004-297872) filed on Oct. 12, 2004, which is incorporated herein by reference.

INDUSTRIAL APPLICABILITY

The invention has the advantage of making it possible to allow only communications in a narrower range to pass through by performing packet filtering in address and port number pair units even in a situation in which mobile network communications are operated and making it possible to establish communications not only when a mobile terminal in an internal network moves to an external network, but also when a different terminal connected to the external network communicates with a terminal in the internal network. It also has the advantage of making it possible to substantially detect unknown attack by monitoring a packet sequence of communications determined by the media type and detecting unauthorized access not meeting normal access based on the normal access determination condition defined for each media type. The present invention is useful for a firewall system and a firewall control method for dynamically controlling a firewall in a network where communications using a mobile network of mobile IP, etc.

The invention claimed is:

1. A firewall system for controlling communications between an external network and an internal network, comprising:
　a call control proxy section for relaying a call control sequence for establishing communications between terminals connected to the external network or the internal network;
　an address correspondence information management section for managing the correspondence between new and old addresses of each terminal changed as the terminal moves or re-connects to the network;
　a filtering control section for setting an address and port number pair as a filtering condition of a packet permitted to pass through between the internal network and the external network based on information of the address and the port number of the terminal used for communications obtained from the call control proxy section and information of the correspondence between new and old addresses obtained from the address correspondence information management section;
　a packet filtering section for allowing a packet determined based on the filtering condition containing the address and port number pair to pass through;
　a normal access determination condition storage section for storing a normal access determination condition defined for each communication media type; and
　an unauthorized access detection section for detecting unauthorized access if a passing packet does not meet the normal access determination condition based on information obtained from the call control proxy section of the address, the port number, and the media type of the terminal used for communications, information of the correspondence between new and old addresses obtained from the address correspondence information management section, and the normal access determination condition obtained from the normal access determination condition storage section,
　wherein said information obtained from the call control proxy section of the address, the port number, and the media type are determined by the call control proxy section during the call control sequence that establishes said communications between terminals.

2. The firewall system according to claim 1,
　wherein the call control proxy section comprises a relay section information retention section for retaining information concerning a different trusted call control proxy section, and
　wherein the filtering control section acquires information of an address and a port number in communications between terminals established via the different call control proxy section and sets a filtering condition based on the pair of the address and the port number.

3. The firewall system according to claim 1, wherein the filtering control section sets a filtering condition based on the most recent address and port number pair if at least one of a terminal on the internal terminal and a terminal on the external terminal moves and address information obtained from the call control proxy section or the address correspondence information management section is changed.

4. The firewall system according to claim 1, wherein, if at least one of a terminal on the internal terminal and a terminal on the external terminal moves and address information obtained from the call control proxy section or the address correspondence information management section is changed, the unauthorized access detection section determines the normal access determination condition based on the most recent address information.

5. A firewall control method for controlling communications between an external network and an internal network, the firewall control method comprising the steps of:
　acquiring information of the address, the port number, and the media type of a terminal used for communications from a call control proxy section for relaying a call control sequence for establishing communications between terminals connected to the external network or the internal network, wherein said information is determined by the call control proxy section during the call control sequence that establishes said communications between terminals;
　acquiring information of the correspondence between new and old addresses from an address correspondence information management section for managing the correspondence between new and old addresses of each terminal changed as the terminal moves or re-connects to the network;
　setting an address and port number pair as a filtering condition of a packet permitted to pass through between the internal network and the external network based on the information of the address and the port number of the terminal used for communications and the information of the correspondence between new and old addresses; and
　detecting unauthorized access if a passing packet does not meet the normal access determination condition based on the information of the address, the port number, and the media type of the terminal used for communications, the information of the correspondence between new and old addresses, and a normal access determination condition defined for each communication media type and stored in a normal access determination condition storage section.

* * * * *